(12) United States Patent
Nazarpoor

(10) Patent No.: US 8,858,903 B2
(45) Date of Patent: Oct. 14, 2014

(54) METHODS FOR OXIDATION AND TWO-WAY AND THREE-WAY ZPGM CATALYST SYSTEMS AND APPARATUS COMPRISING SAME

(71) Applicant: Zahra Nazarpoor, Camarillo, CA (US)

(72) Inventor: Zahra Nazarpoor, Camarillo, CA (US)

(73) Assignee: Clean Diesel Technology Inc, Ventura, CA (US)

( * ) Notice: Subject to any disclaimer, the term of this patent is extended or adjusted under 35 U.S.C. 154(b) by 0 days.

(21) Appl. No.: 13/849,169

(22) Filed: Mar. 22, 2013

(65) Prior Publication Data

US 2014/0271425 A1 Sep. 18, 2014

Related U.S. Application Data

(60) Provisional application No. 61/791,721, filed on Mar. 15, 2013.

(51) Int. Cl.
*B01D 53/94* (2006.01)
*F01N 3/28* (2006.01)

(52) U.S. Cl.
CPC ....... *B01D 53/945* (2013.01); *Y10S 502/52712* (2013.01)
USPC .............. 423/213.2; 60/274; 60/299; 60/301; 502/304; 502/345; 502/347; 502/527.12

(58) Field of Classification Search
USPC .................. 423/213.2; 60/274, 299, 301; 502/527.12, 304, 345, 347
See application file for complete search history.

(56) References Cited

U.S. PATENT DOCUMENTS

| 3,284,370 | A | * | 11/1966 | Clifford et al. ............... 502/304 |
| 4,062,810 | A | * | 12/1977 | Vogt et al. ..................... 502/304 |
| 4,661,329 | A | * | 4/1987 | Suzuki et al. ............... 423/245.3 |
| 4,673,556 | A | | 6/1987 | McCabe et al. |
| 5,063,193 | A | * | 11/1991 | Bedford et al. ................ 502/304 |
| 5,658,543 | A | * | 8/1997 | Yoshida et al. ............ 423/213.2 |
| 5,747,410 | A | * | 5/1998 | Muramatsu et al. .......... 502/348 |
| 6,129,834 | A | * | 10/2000 | Peters et al. ............. 208/120.01 |
| 6,576,587 | B2 | | 6/2003 | Labarge et al. |
| 6,624,113 | B2 | | 9/2003 | Labarge et al. |
| 7,485,273 | B2 | * | 2/2009 | Gandhi et al. ............. 423/213.2 |
| 7,803,338 | B2 | * | 9/2010 | Socha et al. ................ 423/239.1 |
| 7,875,573 | B2 | | 1/2011 | Beutel et al. |
| 8,080,494 | B2 | | 12/2011 | Yasuda et al. |
| 8,148,295 | B2 | | 4/2012 | Augustine |
| 2009/0324469 | A1 | | 12/2009 | Golden et al. |
| 2009/0324470 | A1 | | 12/2009 | Alamdari et al. |
| 2010/0240525 | A1 | | 9/2010 | Golden et al. |
| 2010/0266473 | A1 | | 10/2010 | Chen et al. |
| 2012/0015801 | A1 | | 1/2012 | Deprez et al. |
| 2013/0323145 | A1 | * | 12/2013 | Tran et al. .................. 423/213.2 |

FOREIGN PATENT DOCUMENTS

JP  62-20613  * 1/1987 ............. 423/213.2

* cited by examiner

*Primary Examiner* — Timothy Vanoy
(74) *Attorney, Agent, or Firm* — Barnes & Thornburg LLP; Thomas J. McWilliams; Edward F. Behm, Jr.

(57) ABSTRACT

Oxidation ZPGM catalyst systems and three way ZPGM catalyst systems are disclosed. ZPGM catalyst systems may oxidize toxic gases, such as carbon monoxide and hydrocarbons, optionally some ZPGM catalyst systems may as well reduce nitrogen oxides that may be included in exhaust gases. ZPGM catalyst systems may include: a substrate, a washcoat, and an overcoat. The washcoat may include at least one ZPGM catalyst and carrier material oxides. Similarly, overcoat may include at least one ZPGM catalyst, carrier material oxides and OSMs. Suitable known in the art chemical techniques, deposition methods and treatment systems may be employed in order to form the disclosed ZPGM catalyst systems.

23 Claims, 21 Drawing Sheets

METHODS FOR OXIDATION AND TWO-WAY AND THREE-WAY ZPGM CATALYST SYSTEMS AND APPARATUS COMPRISING SAME

CROSS-REFERENCE TO RELATED APPLICATIONS

This application claims priority to U.S. Provisional Application No. 61/791,721, entitled Methods for Oxidation and Two-way and Three-way ZPGM Catalyst Systems and Apparatus Comprising Same, filed Mar. 15, 2013.

BACKGROUND

1. Technical Field

This disclosure relates generally to catalytic converters, more particularly, to zero platinum group metals catalytic converters.

2. Background Information

Emission standards for unburned contaminants, such as hydrocarbons, carbon monoxide and nitrogen oxide, continue to become more stringent. In order to meet such standards, oxi-catalysts and three-way catalysts (TWC) are used in the exhaust gas lines of internal combustion engines. These catalysts promote the oxidation of unburned hydrocarbons and carbon monoxide as well as the reduction of nitrogen oxides in the exhaust gas stream. One of the major limitations of current oxi-catalysts and three-way catalysts is that the Platinum Group Metals (PGM) used used in their fabrication have very high demand and increasing prices.

Therefore, there is a continuing need to provide cost effective two way and three way catalyst systems that provide sufficient conversion so that HC, NOx, and CO emission standards can be satisfied, minimizing the amount of PGM catalysts required.

SUMMARY

Two way and three way ZPGM catalyst systems are disclosed. ZPGM catalyst systems may oxidize toxic gases, such as carbon monoxide and hydrocarbons; optionally some ZPGM catalytic converters may as well reduce nitrogen oxides that may be included in exhaust gases. ZPGM catalyst converters may include: a substrate, a washcoat, and an overcoat. Washcoat and overcoat may include at least one ZPGM catalyst, carrier material oxides, and may optionally include OSMs. Suitable known in the art chemical techniques, deposition methods and treatment systems may be employed in order to form the disclosed ZPGM catalyst converters.

Materials suitable for use as catalyst include Copper (Cu), Cerium (Ce), Silver (Ag), Tin (Sn), Niobium (Nb), Zirconium (Zr), Lanthanum (La), Iron (Fe), Cobalt (Co), Manganese (Mn), Calcium (Ca) and combinations thereof.

Catalytic systems that include combinations of Cu, Ce and Ag in the washcoat or overcoat or both may be suitable for use as Oxidation Catalysts at temperatures below 200° C.

Catalytic systems that include Cu—Ce, Cu—Ce—Sn, Cu—Ce—Nb—Zr, and Cu—Ce—Ca may be suitable for use as TWCs at temperatures above 200° C.

Catalytic systems that include La—Ce—Mn—Fe—Co and La—Ce—Fe—Co may be suitable for use as Oxidation Catalysts at temperatures above 200° C.

Suitable materials for use as substrates may include refractive materials, ceramic materials, metallic alloys, foams, microporous materials, zeolites, cordierites, or combinations.

Support materials of use in catalysts containing one or more of the aforementioned combinations may include Cerium Oxide, Alumina, Titanium Oxide, Zirconia, and Ceria/Zirconia (CZO).

Suitable known in the art chemical techniques, deposition methods and treatment systems may be employed in order to form the disclosed ZPGM catalyst systems.

Numerous other aspects, features and advantages of the present disclosure may be made apparent from the following detailed description, taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the invention. In the figures, reference numerals designate corresponding parts throughout the different views.

DETAILED DESCRIPTION

Figure 1:
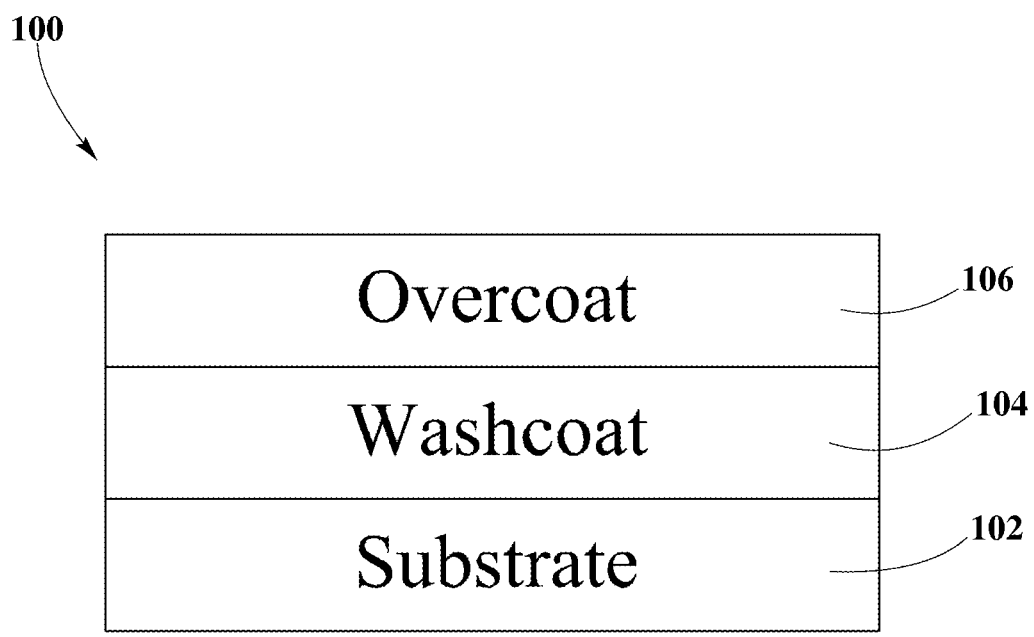
FIG. 1 shows a ZPGM catalyst system structure, according to an embodiment.

The present disclosure is here described in detail with reference to embodiments illustrated in the drawings, which form a part hereof. In the drawings, which are not necessarily to scale or to proportion, similar symbols typically identify similar components, unless context dictates otherwise. Other embodiments may be used and/or other changes may be made without departing from the spirit or scope of the present disclosure. The illustrative embodiments described in the detailed description are not meant to be limiting of the subject matter presented herein.

DEFINITIONS

As used here, the following terms have the following definitions:

"Complexing agent" refers to a substance capable of promoting the formation of complex compounds.

"Exhaust" refers to the discharge of gases, vapor, and fumes including hydrocarbons, nitrogen oxide, and/or carbon monoxide.

"Impregnation" refers to the process of totally saturating a solid layer with a liquid compound.

"Wash-coat" refers to at least one coating including at least one oxide solid that may be deposited on a substrate.

"Over-coat" refers to at least one coating including one or more oxide solids or metals that may be deposited on at least one wash-coat or impregnation layer.

"R Value" refers to the number obtained by dividing the reducing potential by the oxidizing potential.

"Rich Exhaust" refers to exhaust with an R value above 1.

"Lean Exhaust" refers to exhaust with an R value below 1.

"Conversion" refers to the chemical alteration of at least one material into one or more other materials.

"T50" refers to the temperature at which 50% of a material is converted.

"T90" refers to the temperature at which 90% of a material is converted.

"Three Way Catalyst (TWC)" refers to a catalyst suitable for use in converting at least hydrocarbons, nitrogen oxide, and carbon monoxide.

"Oxidation Catalyst" refers to a catalyst suitable for use in converting at least hydrocarbons and carbon monoxide.

"Zero Platinum Group (ZPGM) Catalyst" refers to a catalyst completely or substantially free of platinum group metals.

"Platinum Group Metals (PGMs)" refers to platinum, palladium, ruthenium, iridium, osmium, and rhodium.

DESCRIPTION OF THE DRAWINGS

System Configuration and Composition

FIG. 1 depicts ZPGM Catalyst System 100 configurations, according to various embodiments. As shown in FIG. 1A, ZPGM Catalyst System 100 may include at least a Substrate 102 and a Washcoat 104, where Washcoat 104 may contain active two way or three way ZPGM catalyst components. ZPGM Catalyst System 100 may optionally include an Overcoat 106 applied on over of Washcoat 104. Where Washcoat 104 or Overcoat 106, or both, may include active two way or three way ZPGM catalyst components.

According to an embodiment, Washcoat 104 or Overcoat 106 or both may include at least one ZPGM transition metal catalyst, a ZPGM mixed metal catalyst, a ZPGM zeolite catalyst, or combinations thereof. A ZPGM transition metal catalyst may include one or more transition metals and/or least one rare earth metal, or a mixture; excluding platinum group metals.

Transition Metal Catalyst

According to an embodiment, a ZPGM Catalyst System 100 may include a ZPGM transition metal catalyst. The ZPGM transition metal catalyst may include at least silver oxide and copper oxide distributed in Washcoat 104 or Overcoat 106, or in both. In addition to copper and silver, the ZPGM transition metal catalyst may include one or more transition metals that are completely free of platinum group metals. ZPGM transition metal catalyst may include scandium, titanium, chromium, manganese, iron, cobalt, nickel, zinc, yttrium, zirconium, niobium, molybdenum, cadmium, hafnium, tantalum, tungsten, rhenium and gallium. In some embodiments, nickel, iron, manganese and cobalt may be preferably added to ZPGM Catalyst System 100. Furthermore, ZPGM Catalyst System 100 may optionally include rare earth metals or rare earth metal oxides, e.g., ceria.

Additionally, Washcoat 104 or Overcoat 106, or both, may include support oxides material referred to as carrier material oxides. Carrier material oxides may include aluminum oxide, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof. In some embodiments, carrier material oxides may be doped with one or more lanthanides.

In some embodiments, ZPGM Catalyst System 100 may include alumina mixed with other metals. Carrier material oxide may be present in Washcoat 104 in a ratio of about 40 to about 60 by weight. Carrier material oxides are normally inert and stable at high temperatures (>1000° C.) and under a range of reducing and oxidizing conditions.

In other embodiments, Washcoat 104 or Overcoat 106, or both, may include oxygen storage materials (OSM), such as cerium, zirconium, lanthanum, yttrium, lanthanides, actinides, samarium, and mixtures thereof.

In some embodiments, Washcoat 104 may also include other components such as acid or base solutions or various salts or organic compounds that may be added in order to adjust rheology of the Washcoat 104 and Overcoat 106 slurry and to enhance the adhesion of Washcoat 104 to Substrate 102. Some examples of compounds that can be used to adjust the rheology may include ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol and other suitable compounds. Preferred solution to enhance binding of Washcoat 104 to Substrate 102 may be tetraethyl ammonium hydroxide.

In other embodiments, other components known to one of ordinary skill in the art may be included in Washcoat 104 or Overcoat 106.

Mixed Metal Oxide Catalyst

According to an embodiment, ZPGM Catalyst System 100 may include a mixed metal oxide catalyst, which includes at least one transition metal and at least one other metal. The other metals of the mixed metal oxide may include, but are not limited to alkali and alkaline earth metal, lanthanides, or actinides. The mixed metal oxide may include a spinel, a perovskite, adelafossite, a lyonsite, a garnet, or a pyrochlore or combinations thereof.

According to an embodiment, ZPGM Catalyst System 100 may include a mixed metal oxide catalyst that may include a perovskite having the formula $ABO_3$ or related structures. Partial substitution of the A site with M element will yield the general formula $A_{1-x}M_xBO_3$ and partial substitution of the B site will yield the general formula $AB_{1-x}M_xO_3$. "A" may include lanthanum, lanthanides, actinides, cerium, magnesium, calcium, barium, strontium, or mixtures thereof. "B" may include a single transition metal, or a mixture of transition metals and rare earth metals, including iron, manganese, silver, copper, nickel, cobalt, and cerium, chromium or mixture thereof. M may include cerium, strontium, potassium, sodium, iron, and silver or mixtures thereof.

According to an embodiment, the mixed metal oxide catalyst may have the formula $AMn_{1-x}Cu_xO_3$, wherein "A" may be lanthanum, cerium, barium, strontium, a lanthanide, or an actinide and "x" may have values from 0 to 1.

According to another embodiment, a mixed metal oxide catalyst may have the formula $ACe_{1-x}Cu_xO_3$, where "A" may be lanthanum, barium, strontium, or calcium, and "x" is 0 to 1. According to an embodiment, about 40 g/L to about 180 g/L of the formula $ABO_3$ may be coupled with Substrate 102.

According to one embodiment, the ZPGM Catalyst System 100 may include a perovskite ($ABO_3$) or related structure (with general formula $A_{a-x}B_xMO_b$) and one or more carrier material oxides. The perovskite or related structure may be present in about 5% to about 50% by weight.

According to an embodiment, a mixed metal oxide catalyst that may include a spinel structure having the formula $AB_2O_4$. "A" and "B" of the formula is aluminum, magnesium, manganese, gallium, nickel, copper, silver, cobalt, iron, chromium, titanium, tin, or mixtures thereof. According to an embodiment, mixed metal oxide catalyst that may include a spinel and a carrier material oxide. The spinel may be present in about 5% to about 50% by weight.

Zeolite Catalyst

According to an embodiment, ZPGM Catalyst System 100 may include a zeolite catalyst, where the zeolite catalyst may include a zeolite or mixture of zeolites and at least one transition metal catalyst or a mixed metal oxide catalyst. The zeolite catalyst may include ZSM5, heulandite, chabazite, or mixtures thereof. In one embodiment ZPGM Catalyst System 100 includes at least one transition metal catalyst or a mixed metal oxide catalyst impregnated into a zeolite or mixtures of zeolite. The transition metal(s) may be a single transition metal or a mixture of transition metal which may include, chromium, gallium, manganese, iron, cobalt, nickel, copper, niobium, molybdenum, tungsten, and silver. Preferably, the transition metals are selected from the group consisting of copper, nickel, gallium, cobalt, and mixtures thereof. The transition metals may be present in about 3% to about 25% by weight in any ratio of transition metals.

Additionally, the zeolite catalyst may include support oxides material referred to as carrier material oxides. Carrier material oxides may include aluminum oxide, doped aluminum oxide, pyrochlore, doped ceria, fluorite, zirconium oxide, doped zirconia, titanium oxide, tin oxide, silicon dioxide, zeolite, tin aluminum oxide and mixtures thereof.

In other embodiments, the zeolite catalyst may include oxygen storage materials (OSM), such as cerium, zirconium, yttrium, lanthanides, actinides, and mixtures thereof.

In some embodiments, the zeolite catalyst may also include other components such as acid or base solutions or various salts or organic compounds that may be added in order to adjust rheology of the Washcoat 104 and Overcoat 106 slurry and to enhance binding of Washcoat 104 or Overcoat 106 to Substrate 102.

In other embodiments, other components known to one of ordinary skill in the art may be included in ZPGM Catalyst System 100.

Methods of Preparation of Washcoat and Overcoat

Figure 2:
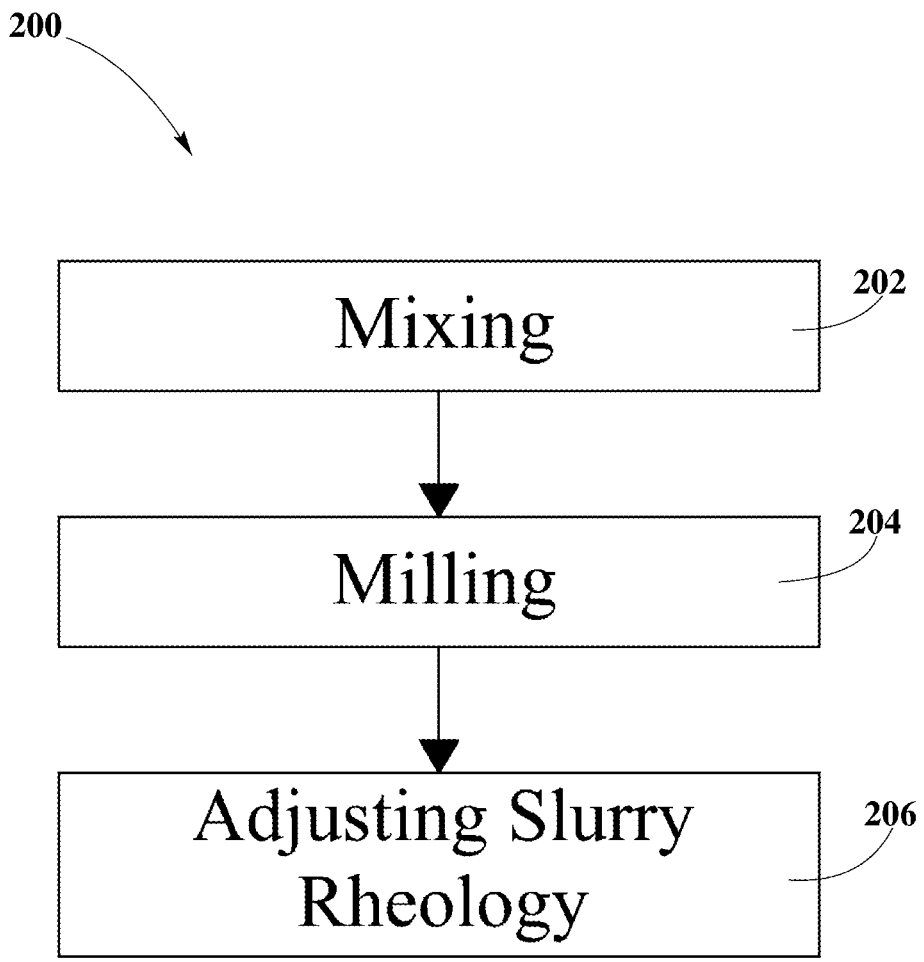
FIG. 2 is a flowchart of a method of preparation of a ZPGM catalyst, according to an embodiment.

FIG. 2 is a flowchart of Method for Preparation 200 of Washcoat 104 and Overcoat 106, according to an embodiment.

According to the present disclosure, Washcoat 104 or Overcoat 106 may be prepared by following Method for Preparation 200. In an embodiment, Method for Preparation 200 may be a "co-milling method" which may begin with a Mixing 202 process. In this process, components of Washcoat 104 or Overcoat 106, previously described, may be mixed together. Subsequently, the mixture may undergo a Milling Process 204 in which Washcoat 104 or Overcoat 106 materials may be broken down into smaller particle sizes. After Milling Process 204, a catalyst aqueous slurry may be obtained. Milling Process 204 may take from about 10 minutes to about 10 hours, depending on the batch size, kind of material and particle size desired. In one embodiment of the present disclosure, suitable average particle size (APSs) of the slurry may be of about 4 microns to about 10 microns, in order to get uniform distribution of Washcoat 104 particles or Overcoat 106 particles. Finer particles may have more coat ability and better adhesion to Substrate 102 and enhanced cohesion between Washcoat 104 and Overcoat 106 layers. Milling Process 204 may be achieved by employing any suitable mill such as vertical or horizontal mills. In order to measure exact particle size desired during Milling Process 204, a laser light diffraction equipment may be employed. In order to further enhance coatability and binding properties of Washcoat 104 and Overcoat 106, aqueous slurries obtained in Milling Process 204 may undergo an Adjusting Rheology 206 step. In Adjusting Rheology 206 step, acid or base solutions or various salts or organic compounds may be added to the aqueous slurreis. Some examples of compounds that can be used to adjust the rheology may include ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol and other suitable compounds. All steps included in Method for Preparation 200 may be achieved within room temperature.

In other embodiments, Washcoat 104 and Overcoat 106 may be synthesized by any chemical techniques known in the art.

In the preparation of ZPGM Catalyst System 100 including a Substrate 102, a Washcoat 104 and an Overcoat 106, Washcoat 104 may be deposited on Substrate 102 in at least three different ways. First, depositing all desired components in one step. Or second, by depositing components without a catalyst, then separately depositing at least one impregnation component and heating (this separate deposit is also referred to as an impregnation step). The impregnation component may include, without limitation, transition metals, alkali and alkaline earth metals, cerium, lanthanum, yttrium, lanthanides, actinides, or mixtures thereof. During the impregnation step, metal salts may be converted into metal oxides creating a Washcoat 104 that includes at least a catalyst. The third method includes depositing all desired components of Washcoat 104 at once, including metal salts and then heating or calcining ZPGM Catalyst System 100 to convert the metals salts into metal oxides. An Overcoat 106 may be typically applied after treating Washcoat 104, but treating is not required prior to application of Overcoat 106 in every embodiment.

Various amounts of any of the washcoats 104 may be coupled with a Substrate 102, preferably an amount that covers most of, or all of, the surface area of a substrate. In an embodiment, about 60 g/L to about 250 g/L of a Washcoat 104 may be coupled with a Substrate 102.

In an embodiment, a Washcoat 104 may be formed on the Substrate 102 by suspending the oxide solids in water to form an aqueous slurry and depositing the aqueous slurry on Substrate 102 as a Washcoat 104. Other components may optionally be added to the aqueous slurry. Other components such as acid or base solutions or various salts or organic compounds may be added to the aqueous slurry to adjust the rheology of the slurry and enhance binding of the Washcoat 104 to the Substrate 102.

The slurry may be placed on Substrate 102 in any suitable manner. For example, Substrate 102 may be dipped into the slurry, or the slurry may be sprayed on Substrate 102. Other methods of depositing the slurry onto Substrate 102 known to those skilled in the art may be used in alternative embodiments. If Substrate 102 is a monolithic carrier with parallel flow passages, a Washcoat 104 may be formed on the walls of the passages.

Preparation of a Zero Platinum Group Metal Catalyst by Impregnation

A Washcoat 104 having may be prepared by methods well known in the art. Washcoat 104 may comprise any of the catalysts and additional components described above. Washcoat 104 may be deposited on a Substrate 102 and subsequently treated. The treating may be done at a temperature between 300° C. and 700° C. In some embodiments, at about 550° C. The treatment may last from about 2 to about 6 hours. In some embodiments, the treatment may last about 4 hours. After Substrate 102 coated with Washcoat 104 is treated, Substrate 102 my be cooled to about room temperature. After cooling, Washcoat 104 may be impregnated with at least one impregnation component. The impregnation component may include, at least one transition-metal salt being dissolved in water. Following the impregnation step, ZPGM Catalyst System 100 with the impregnation components may be heat treated. The treating may be performed from about 300° C. to about 700° C. In some embodiments, this second heat treatment may be performed at about 550° C. The treating may last from about 2 to about 6 hours, preferably about 4 hours. In an embodiment, Washcoat 104 and the impregnation component may be treated before coating.

Impregnation of Silver

A Washcoat 104 including a transition metal such as Ag may be prepared by methods well known in the art. Washcoat 104 may include only carrier oxide described herein. Washcoat 104 may be deposited on a Substrate 102 and then heat treated. The heat treatment may be done at a temperature between 300° C. and 700° C. In some embodiments this treatment may be performed at about 550° C. The heat treatment may last from about 2 to about 6 hours. In an embodiment the treatment may last about 4 hours. After Washcoat 104 and Substrate 102 are treated, they are cooled to about room temperature. After cooling, Washcoat 104 is impregnated with at least one impregnation component such as silver. The impregnation component includes at least silver salts, dissolved in water and capable of being impregnated on the Washcoat 104. Following the impregnation step, Washcoat 104 with the impregnation components may be heat treated. The heat treatment may be performed at about 300° C. to about 700° C. In some embodiments this treatment may be performed at about 550° C. The heat treatment may last from about 2 to about 6 hours. In an embodiment the treatment may last about 4 hours. According to an embodiment, Substrate 102, Washcoat 104, and the impregnation components may be treated to form ZPGM Catalyst System 100. In an embodiment, Washcoat 104 and the impregnation component may be heat treated before coating.

Preparation of a Zero Platinum Group Metal Catalyst by Precipitation

The method of precipitation includes precipitating transition metal salt or salts on Washcoat 104. The transition metal salt or salts may be precipitated with NH4OH, (NH4)2CO3, tetraethylammonium hydroxide, other tetraalkylammonium salts, ammonium acetate, or ammonium citrate. Subsequently, the precipitated transition metal salt or salts and Washcoat 104 may be aged. The aging may take from about 2 hours to about 24 hours. After aging, the precipitated transition metal salt or salts and Washcoat 104 may be deposited on a Substrate 102 followed by a heat treatment that may last from about 2 hours to about 6 hours. In an embodiment the treatment may last about 4 hours. The treatment may be performed at a temperature from about 300° C. to about 700° C. In some embodiments, the suitable temperature for the treatment may be of about 550° C. Optionally, after treatment, Overcoat 106 may be deposited on the treated precipitated transition metal salt or salts and Washcoat 104. Then, ZPGM Catalyst System 100 may be heat treated. This treatment may be performed at about 300° C. to about 700° C. In some embodiments this treatment may be performed at about 550° C. The heat treatment may last from about 2 to about 6 hours. In an embodiment the treatment may last about 4 hours.

Co-Precipitation of Silver

A Washcoat 104 including at least one transition metal such as silver may be prepared by methods well known in the art. In some embodiments, the method of co-precipitation may include precipitating a silver salt on Washcoat 104. Suitable components for precipitation of the silver salts may include NH4OH, (NH4)2CO3, tetraethylammonium hydroxide, other tetraalkylammonium salts, ammonium acetate, ammonium carbonate or ammonium citrate. Next, the precipitated silver salt or salts and Washcoat 104 are deposited on a Substrate 102 followed by heat treatment that may last from about 2 hours to about 6 hours. In an embodiment the treatment may last about 4 hours. The treatment may be performed at a temperature from about 300° C. to about 700° C. In some embodiments, the suitable temperature for the treatment may be of about 550° C. Optionally, after heat treating, an Overcoat 106 may be deposited on the treated precipitated transition metal salt and Washcoat 104 and heat treated again. Then, ZPGM Catalyst System 100 may be heat treated. This treatment may be performed at about 300° C. to about 700° C. In some embodiments this treatment may be performed at about 550° C. The heat treatment may last from about 2 to about 6 hours. In an embodiment the treatment may last about 4 hours. The co-precipitation of silver may optionally be performed on an Overcoat 106. Afterwards, the precipitated silver salt and Overcoat 106 may be heat treated. This heat treatment may be from about 2 hours to about 24 hours.

Preparation of a Zero Platinum Group Metal Catalyst by Co-Milling

In some embodiments, to prepare ZPGM catalysts, the catalysts and a carrier material oxides are milled together. The catalyst may be previously synthesized by any chemical technique such as solid-state synthesis, precipitation, or any other technique known in the art. The milled catalyst and carrier material oxide may be deposited on a Substrate 102 in the form of a Washcoat 104 and then treated. This treatment may be performed at about 300° C. to about 700° C. In some embodiments this treatment may be performed at about 550° C. The heat treatment may last from about 2 to about 6 hours. In an embodiment the treatment may last about 4 hours. Optionally, an Overcoat 106 may be deposited on the treated ZPGM catalyst after cooling to about room temperature. The Overcoat 106, Washcoat 104 and Substrate 102 are treated This treatment may be performed at about 300° C. to about 700° C. In some embodiments this treatment may be performed at about 550° C. The heat treatment may last from about 2 to about 6 hours. In an embodiment the treatment may last about 4 hours. According to some embodiments, ZPGM catalyst systems 100 including active catalysts prepared by co-milling may be able to have improved performance when compared with ZPGM catalyst systems 100 including active catalysts prepared by other methods due to a better dispersion of the catalysts.

Co-Milling of Silver

A transition metal such as silver and a carrier material oxide may be milled together. The milled catalyst and carrier material oxide are deposited on a Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. Optionally, an Overcoat 106 may be deposited on the treated catalyst after cooling to about room temperature. Subsequently, Overcoat 106, Washcoat 104 and Substrate 102 may be heat treated. This treatment may be performed at about 300° C. to about 700° C. In some embodiments this treatment may be performed at about 550° C. The heat treatment may last from about 2 to about 6 hours. In an embodiment the treatment may last about 4 hours.

Stabilization of Catalysts

In some embodiments, the active catalysts included in ZPGM Catalyst System 100 may need to be stabilized for enhanced effectiveness of dispersion. The stabilized metal particles may include include a transition-metal salt dissolved in a stabilizer solution. Some examples of compounds that can be used as stabilizer solutions for the transition metal ions may include polyethylene glycol, polyvinyl alcohol, poly(N-vinyl-2pyrrolidone) (PVP), polyacrylonitrile, polyacrylic acid, multilayer polyelectrolyte films, poly-siloxane, oligosaccharides, poly(4-vinylpyridine), poly(N,Ndialkylcarbodiimide), chitosan, hyper-branched aromatic polyamides and other suitable polymers. The stabilized transition metal solution may then be impregnated on Washcoat 104, or co-milled with carrier material oxides and deposited on a Substrate 102. After deposition a heat treatment may be required. This treatment may be performed at about 300° C. to about 700° C. In some embodiments this treatment may be performed at about 550° C. The heat treatment may last from about 2 to about 6 hours. In an embodiment the treatment may last about 4 hours.

EXAMPLES

In example 1, a ZPGM Catalyst System 100 including a ZPGM transition metal catalyst having a cordierite Substrate 102, a Washcoat 104 and no Overcoat 106 is prepared. Where Washcoat 104 includes at least silver, a carrier material oxide such as alumina, and an oxygen storage material (which may be a mixture of cerium and zirconium). In this catalyst system, the oxygen storage material and the alumina may be present in Washcoat 104 in a ratio of 40% to about 60% by weight. The silver in Washcoat 104 is present in about 1% to about 20%, or about 4% to about 10% by weight. To prepare the ZPGM Catalyst System 100 of example 1, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hour.

Figure 3:
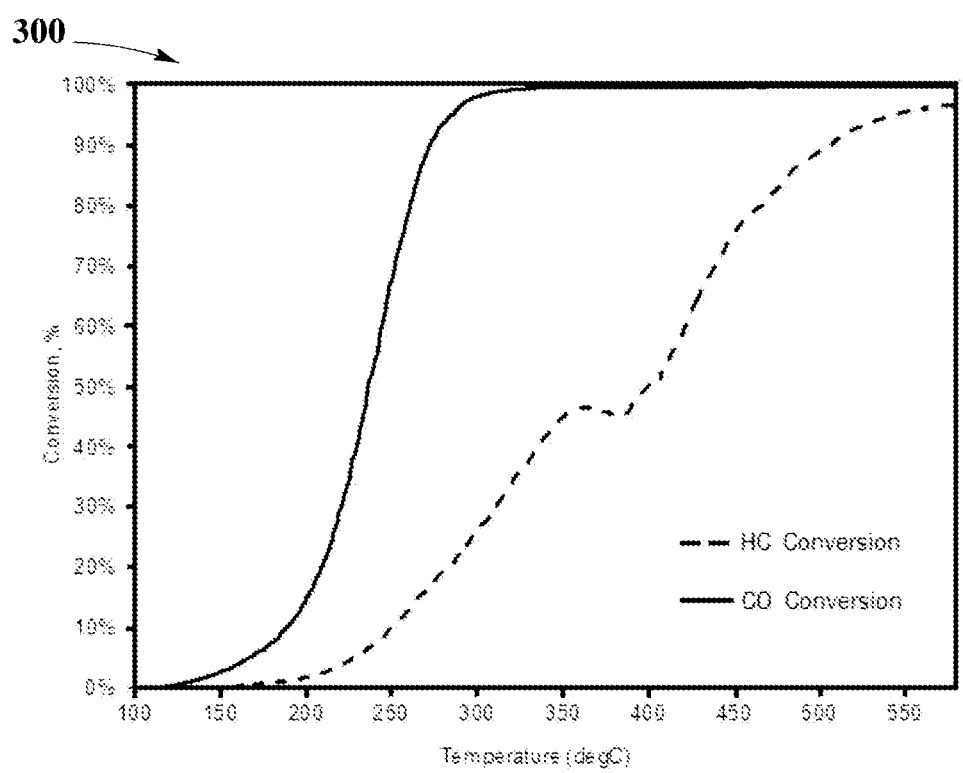
FIG. 3 shows light-off test results of a ZPGM catalyst system, according to an embodiment.

FIG. 3 shows the light-off test Results 300 for the ZPGM Catalyst System 100 of example 1. Prior to the light off test, the ZPGM Catalyst System 100 of example 1 is aged under dry air condition at 900° C. for 4 hours. The hydrocarbon present in the feed stream is propene ($C_3H_6$). Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 580° C. at a constant rate of 40° C./min. The light-off test at R=0.316 shows that the ZPGM Catalyst System 100 of example 1 has T50 for CO of 237° C. and a T50 for HC of 402° C.

In example 2, a ZPGM Catalyst System 100 including a ZPGM transition metal catalyst having a cordierite Substrate 102, a Washcoat 104 and an Overcoat 106 is prepared. Washcoat 104 may include an oxygen storage material (which may be a mixture of cerium and zirconium) and alumina. Overcoat 106 includes copper oxide, ceria, alumina, and at least one oxygen storage material. The oxygen storage material is a mixture of cerium, zirconium, neodymium, and praseodymium. The oxygen storage material and the alumina may be present in Washcoat 104 in a ratio between 40% and about 60% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. The ZPGM Catalyst System 100 of example 2 is prepared using co-milling techniques previously described. After deposition, Washcoat 104 and Overcoat 106 are treated. This treatment may be performed at about 300° C. to about 700° C. In some embodiments this treatment may be performed at about 550° C. The heat treatment may last from about 2 to about 6 hours. In an embodiment the treatment may last about 4 hours.

Figure 4:
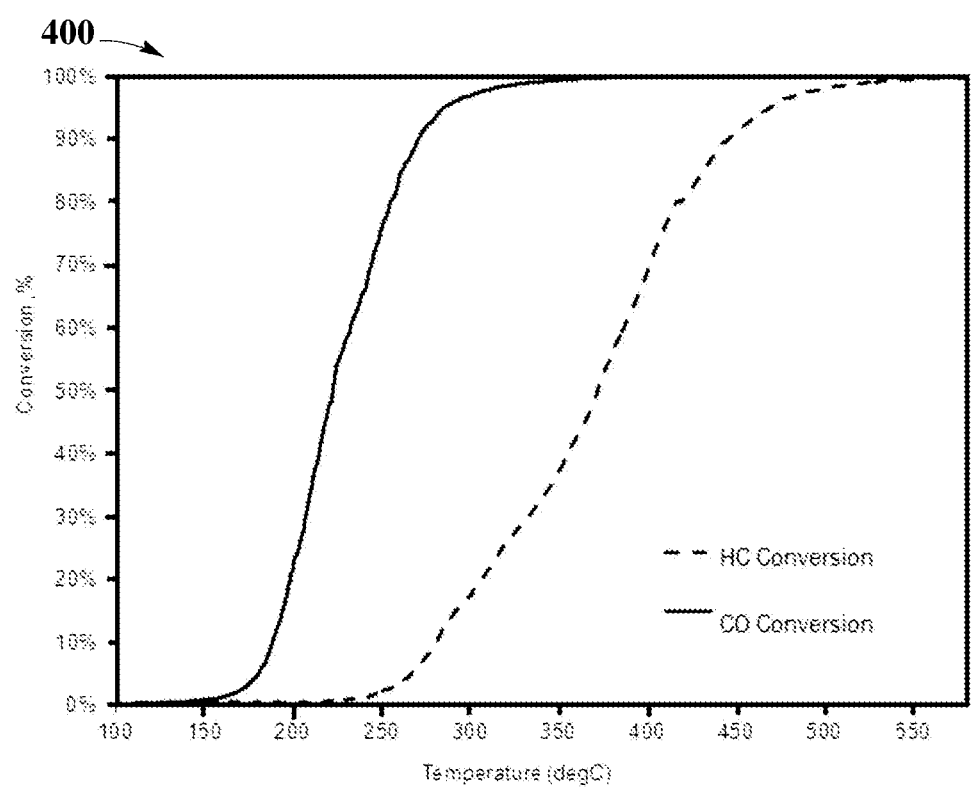
FIG. 4 shows light-off test results of a ZPGM catalyst system, according to an embodiment.

FIG. 4 shows the light-off test Results 400 for the ZPGM Catalyst System 100 of example 2. Prior to the light off test, the ZPGM Catalyst System 100 of example 2 is aged under dry air condition at 900° C. for 4 hours. The hydrocarbon present in the feed stream is propene ($C_3H_6$). Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 580° C. at a constant rate of 40° C./min. The light-off test at R=0.316 shows that the ZPGM Catalyst System 100 of example 2 has a T50 for CO of 222° C. and a T50 for HC of 372° C.

In example 3, a ZPGM Catalyst System 100 including a ZPGM transition metal catalyst having a cordierite Substrate 102, a Washcoat 104 and an Overcoat 106 is prepared. The Washcoat 104 includes at least silver, a carrier material oxide such as alumina, and an oxygen storage material (which may be a mixture of cerium and zirconium). The Overcoat 106 includes at least copper oxide, ceria, alumina, and one oxygen storage material. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 3, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 5:
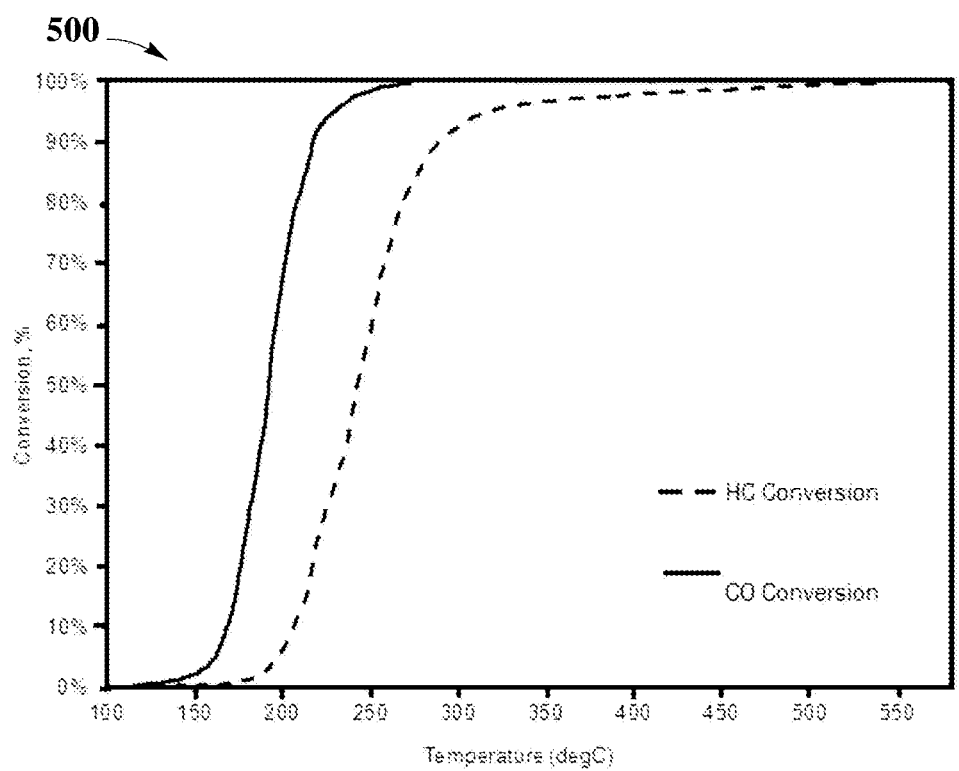
FIG. 5 shows light-off test results of a ZPGM catalyst system, according to an embodiment.

FIG. 5 shows the light-off test Results 500 for the ZPGM Catalyst System 100 of example 3. Prior to the light off test, the ZPGM Catalyst System 100 of example 3 is aged under dry air condition at 900° C. for 4 hours. The hydrocarbon present in the feed stream is propene ($C_3H_6$). Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 580° C. at a constant rate of 40° C./min. The light-off test at R=0.316 shows that the ZPGM Catalyst System 100 of example 3 has a T50 for CO of 192° C. and a T50 for HC of 242° C.

In example 4, a ZPGM Catalyst System 100 including a ZPGM transition metal catalyst having a cordierite Substrate 102, a Washcoat 104 and an Overcoat 106 is prepared. Washcoat 104 may include an oxygen storage material (which may be a mixture of cerium and zirconium) and alumina. Overcoat 106 includes copper oxide, silver, ceria, alumina, and at least one oxygen storage material. The oxygen storage material is a mixture of cerium, zirconium, neodymium, and praseodymium. The oxygen storage material and the alumina may be present in Washcoat 104 in a ratio between 40% and about 60% by weight. The alumina and oxygen storage material included in Overcoat 106 are present in a ratio of about 60% to about 40% by weight. The copper in Overcoat 106 is present from about 5% to about 50% by weight or from about 10% to 16% by weight. The silver in Overcoat 106 is present from about 1% to about 20% by weight or from about 4% to 10% by weight. Additionally, ceria in Overcoat 106 is present from about 5% to about 50% by weight or from about 12% to 20% by weight. The ZPGM Catalyst System 100 of example 4 is prepared by co-precipitation methods described above. After deposition, Washcoat 104 and Overcoat 106 are treated. This treatment may be performed at temperatures from about 300° C. to about 700° C. In some embodiments this treatment may be performed at about 550° C. The heat treatment may last from about 2 to about 6 hours. In an embodiment the treatment may last about 4 hours.

Figure 6:
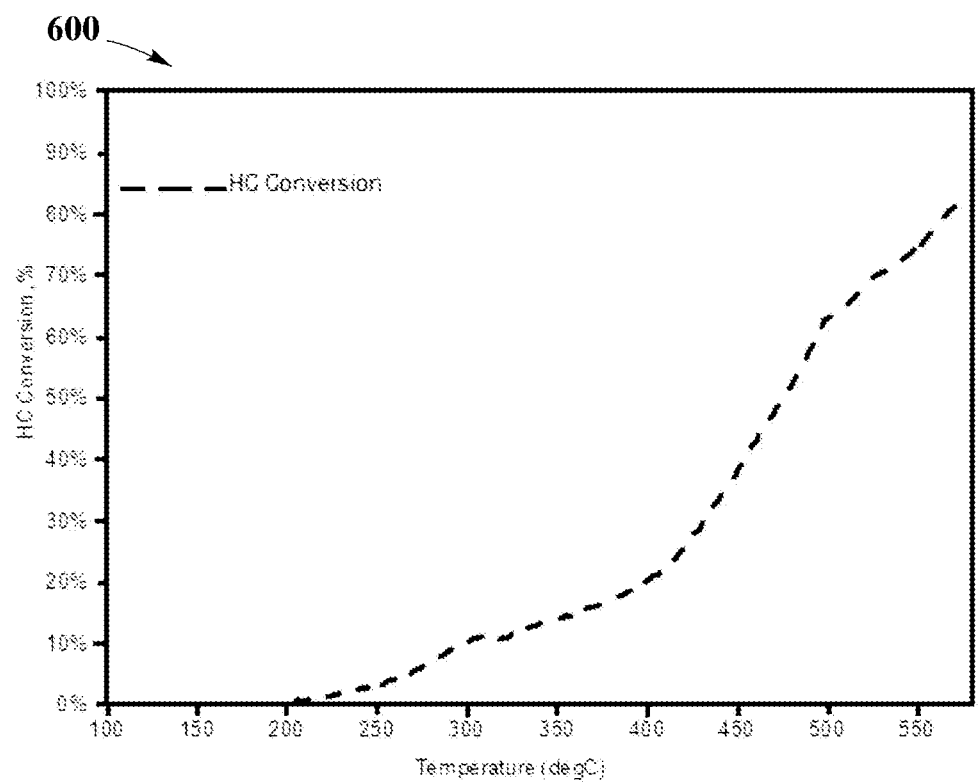
FIG. 6 shows light-off test results of a ZPGM catalyst system, according to an embodiment.

FIG. 6 shows the light-off test Results 600 for the ZPGM Catalyst System 100 of example 4. Prior to the light off test, the ZPGM Catalyst System 100 of example 4 is aged under dry air condition at 900° C. for 4 hours. The hydrocarbon present in the feed stream is propene ($C_3H_6$). Hydrocarbons conversion is measured as a function of the ZPGM Catalyst System 100 temperature. Since the light-off test is performed under lean condition (R-values<1), no nitrogen oxide conversion is measured. The test is performed by increasing the temperature from about 100° C. to 580° C. at a constant rate of 40° C./min. The light-off test at R=0.316 shows that the ZPGM Catalyst System 100 of example 4 has a T50 for HC at 475° C.

In example 5, a ZPGM Catalyst System 100 including a ZPGM transition metal catalyst having a cordierite Substrate 102, a Washcoat 104 and an Overcoat 106 is prepared by co-milling using stabilized silver. The Washcoat 104 includes at least silver, a carrier material oxide such as alumina, and an oxygen storage material (which may be a mixture of cerium and zirconium). The Overcoat 106 includes at least copper oxide, ceria, alumina, and one oxygen storage material. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The silver in Washcoat 104 is present in about 1% to about 20%, or from about 4% to about 10% by weight. The copper in Overcoat 106 is present from about 5% to about 50% by weight or from about 10% to 16% by weight. Additionally, ceria in Overcoat 106 is present from about 5% to about 50% by weight or from about 12% to 20% by weight. The silver is stabilized using at least one stabilizer solution, selected from a group including polyethylene glycol, polyvinyl alcohol, poly(N-vinyl-2pyrrolidone) (PVP), polyacrylonitrile, polyacrolic acid, multilayer polyelectrolyte films, poly-siloxane, oligosaccharides, poly(4-vinylpyridine), poly(N,N-dialkylcarbodiimide), chitosan, hyper-branched aromatic polyamids and other suitable substances. The silver salt is dissolved in the stabilizer solution with a ratio of silver to stabilizer between 0.1 and 5 by weight or between 0.5 and 1 by weight. The stabilized silver solution and the carrier material oxide are milled together and deposited on Substrate 102 as Washcoat 104. Prior to the application of Overcoat 106, Substrate 102 and Washcoat 104 are heat treated. This treatment may be performed at about 550° C. The heat treatment may last from about 2 to about 6 hours. Overcoat 106 is deposited and Substrate 102 is heat treated at 550° C. for 4 hours.

Figure 7:
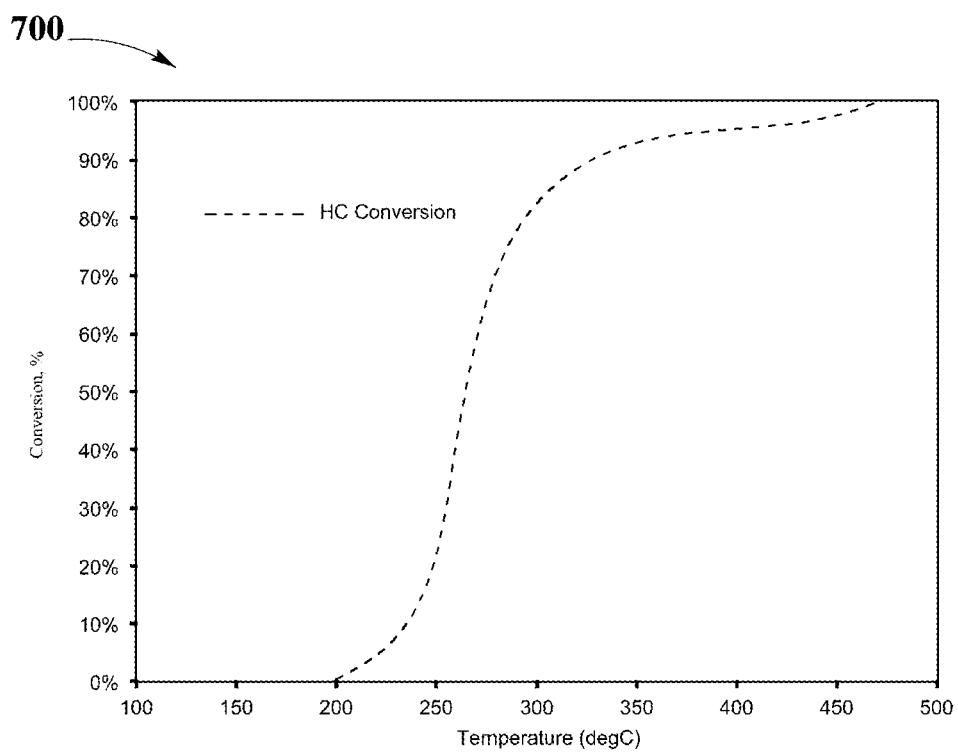
FIG. 7 shows light-off test results of a ZPGM catalyst system, according to an embodiment.

FIG. 7 shows the light-off test Results 700 for the ZPGM Catalyst System 100 of example 4. Prior to the light off test, the ZPGM Catalyst System 100 of example 4 is aged under dry air condition at 900° C. for 4 hours. The hydrocarbon present in the feed stream is propene ($C_3H_6$). Hydrocarbons conversion is measured as a function of the ZPGM Catalyst System 100 temperature. Since the light-off test is performed under lean condition (R-values<1), no nitrogen oxide conversion is measured. The test is performed by increasing the temperature from about 100° C. to 580° C. at a constant rate of 40° C./min. The light-off test at R=0.316 shows that the ZPGM Catalyst System 100 of example 4 has a T50 for HC at 298° C.

In example 6, a ZPGM Catalyst System 100 including a ZPGM transition metal catalyst having a cordierite Substrate 102, a Washcoat 104 and an Overcoat 106 is prepared. The Washcoat 104 includes at least silver, a carrier material oxide such as alumina, and an oxygen storage material (which may be a mixture of cerium and zirconium). The Overcoat 106 includes at least copper oxide, ceria, alumina, and one oxygen storage material. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The silver in Washcoat 104 is present in about 1% to about 20%, or from about 4% to about 10% by weight. The alumina and oxygen storage material included in Overcoat 106 are present in a ratio of about 40% to about 60% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 6, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104, then Overcoat 106 is deposited and ZPGM Catalyst System 100 is heat at 550° C. for 4 hours.

Figure 8:
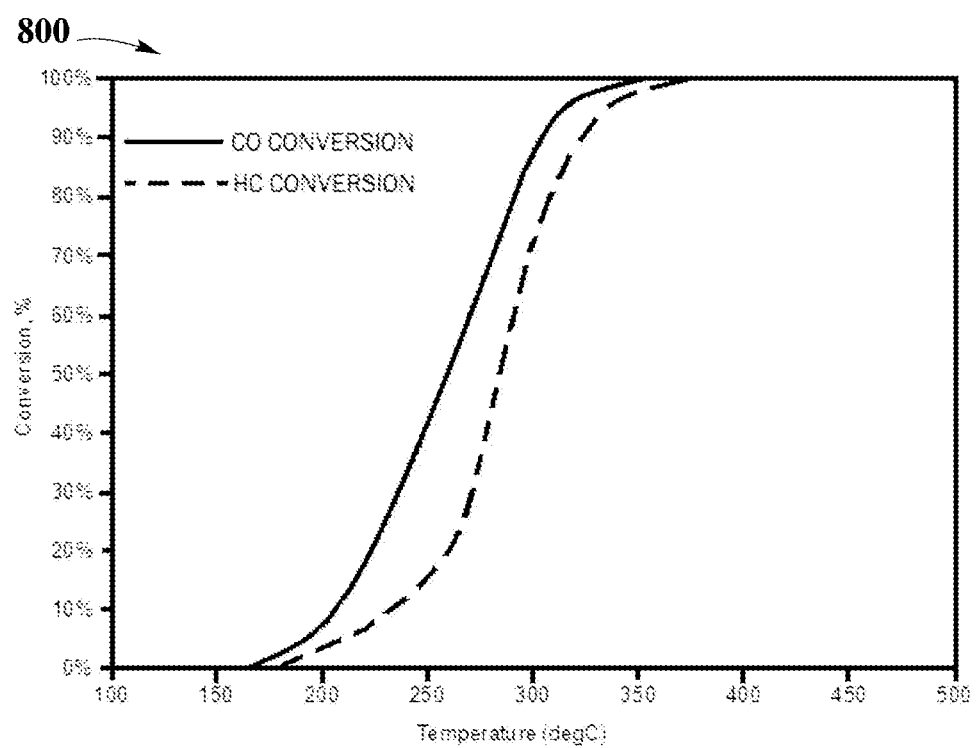
FIG. 8 shows light-off test results of a ZPGM catalyst system, according to an embodiment.

FIG. 8 shows the light-off test Results 800 for the ZPGM Catalyst System 100 of example 6. Prior to the light off test, the ZPGM Catalyst System 100 of example 6 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 6 has a T50 for CO of 260° C. and a T50 for HC of 284° C.

Figure 9:
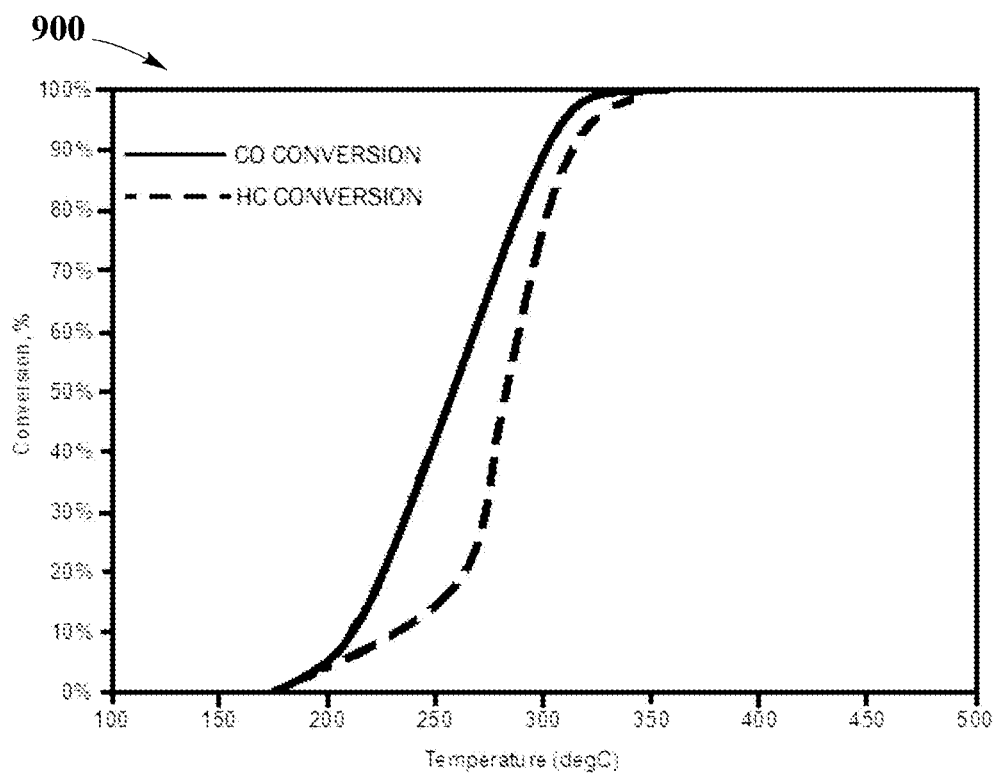
FIG. 9 shows light-off test results of a ZPGM catalyst system, according to an embodiment.

FIG. 9 shows the light-off test Results 900 for the ZPGM Catalyst System 100 of example 6 having a calcination temperature of 750° C. Prior to the light off test, the ZPGM Catalyst System 100 of example 6 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 6 has a T50 for CO of 253° C. and a T50 for HC of 277° C.

Figure 10:
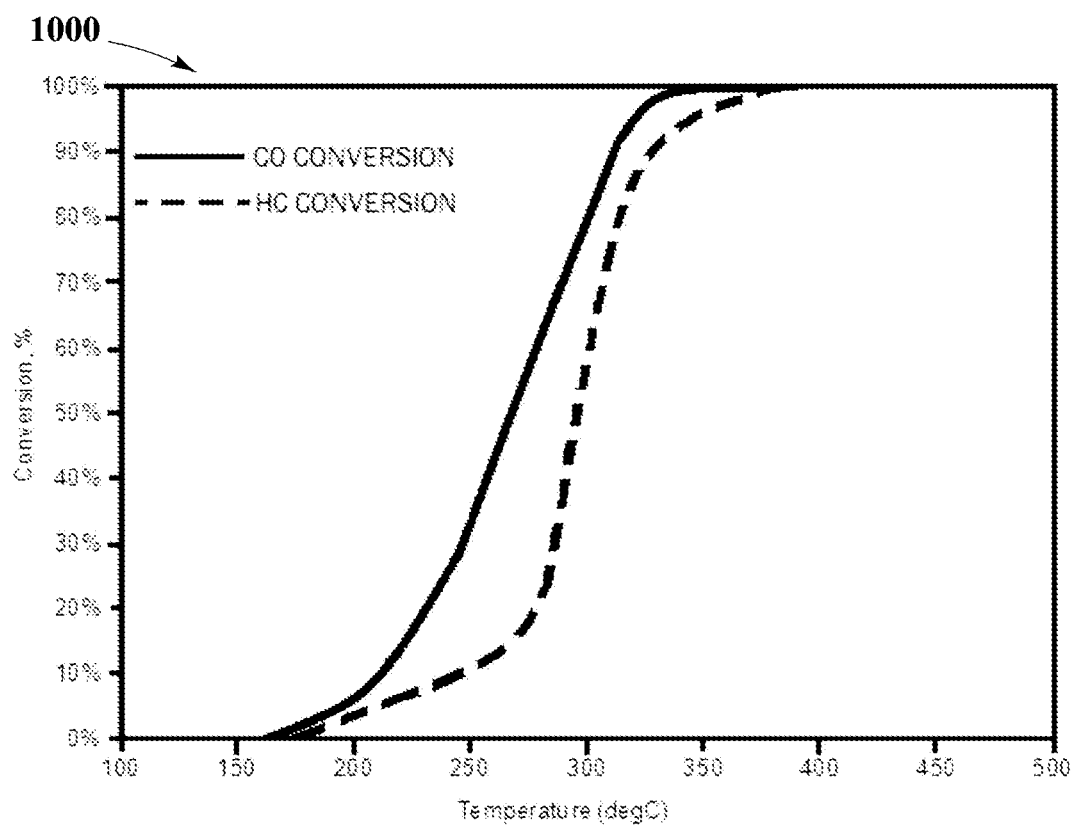
FIG. 10 shows light-off test results of a ZPGM catalyst system, according to an embodiment.

FIG. 10 shows the light-off test Results 1000 for the ZPGM Catalyst System 100 of example 6, having a calcination temperature of 900° C. Prior to the light off test, the ZPGM Catalyst System 100 of example 6 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 6 has a T50 for CO of 266° C. and a T50 for HC of 291° C.

In example 7, a ZPGM Catalyst System 100 including a ZPGM transition metal catalyst having a cordierite Substrate 102, a Washcoat 104 and an Overcoat 106 is prepared. The Washcoat 104 includes at least silver, and a carrier material oxide such as alumina. There is no OSM in Washcoat 104. The Overcoat 106 includes at least copper oxide, ceria, alumina, and one oxygen storage material. The oxygen storage material material present in Overcoat 106 is a mixture of cerium, zirconium, neodymium, and praseodymium. The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 7, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 11:
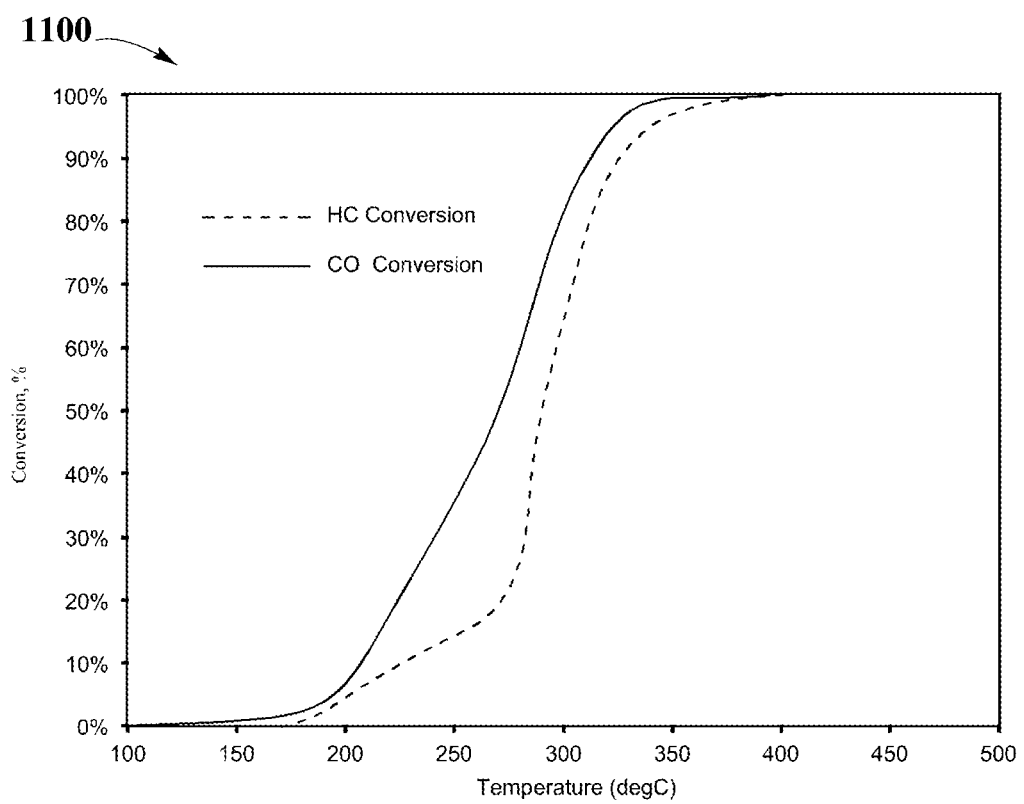
FIG. 11 shows light-off test results of a ZPGM catalyst system, according to an embodiment.

FIG. 11 shows the light-off test Results 1100 for the ZPGM Catalyst System 100 of example 7. Prior to the light of test, the ZPGM Catalyst System 100 of example 7 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 7 has a T50 for CO of 270° C. and a T50 for HC of 292° C.

In example 8, a ZPGM Catalyst System 100 including a ZPGM transition metal catalyst having a cordierite Substrate 102, a Washcoat 104 and an Overcoat 106 is prepared, without including any OSM in Washcoat 104 or Overcoat 106. The Washcoat 104 includes at least silver, and a carrier material oxide such as alumina. There is no OSM in Washcoat 104. The Overcoat 106 includes at least copper oxide, ceria, and alumina. The silver in Washcoat 104 is present in about 1% to about 20%, or from about 4% to about 10% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 8, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 12:
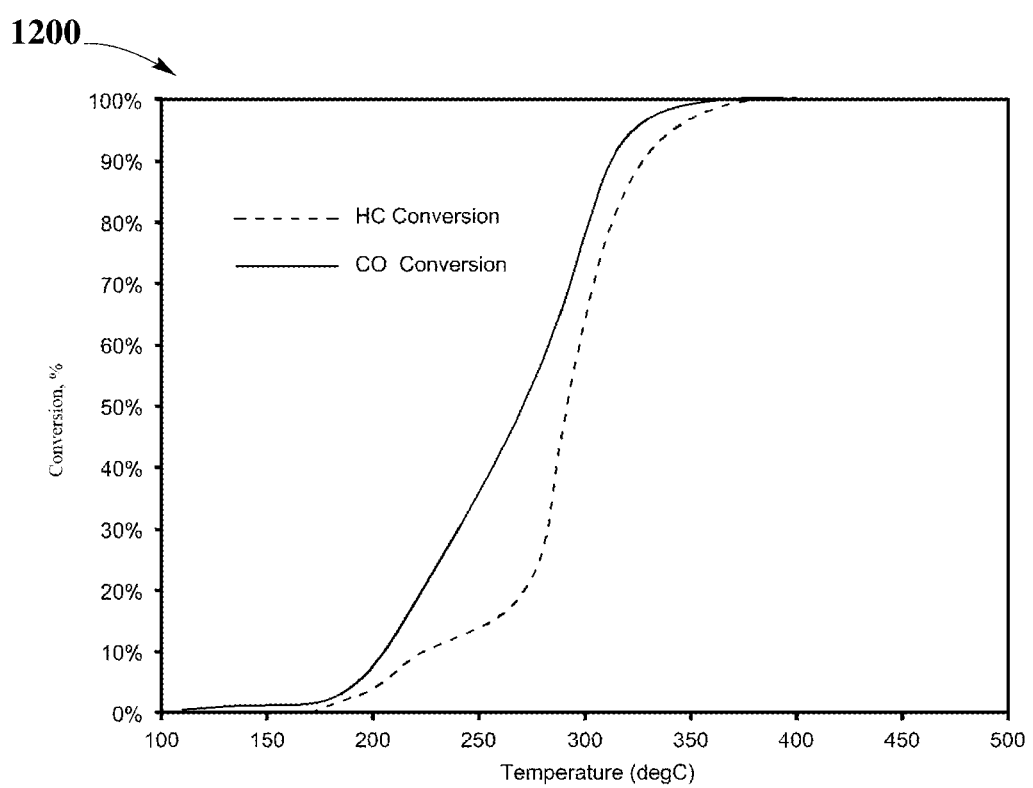
FIG. 12 shows light-off test results of a ZPGM catalyst system, according to an embodiment.

FIG. 12 shows the light-off test Results 1200 for the ZPGM Catalyst System 100 of example 8. Prior to the light of test, the ZPGM Catalyst System 100 of example 8 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 8 has a T50 for CO of 264° C. and a T50 for HC of 300° C.

In example 9, a ZPGM Catalyst System 100 including a ZPGM transition metal catalyst having a cordierite Substrate 102, a Washcoat 104 and an Overcoat 106 is prepared. The Washcoat 104 includes at least silver, a as carrier material oxide such as alumina. There is no OSM in Washcoat 104. The Overcoat 106 includes at least copper oxide, ceria, alumina, and one oxygen storage material. The oxygen storage material material present in Overcoat 106 is a mixture of cerium, zirconium and neodymium (CZNd). The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 9, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 13:
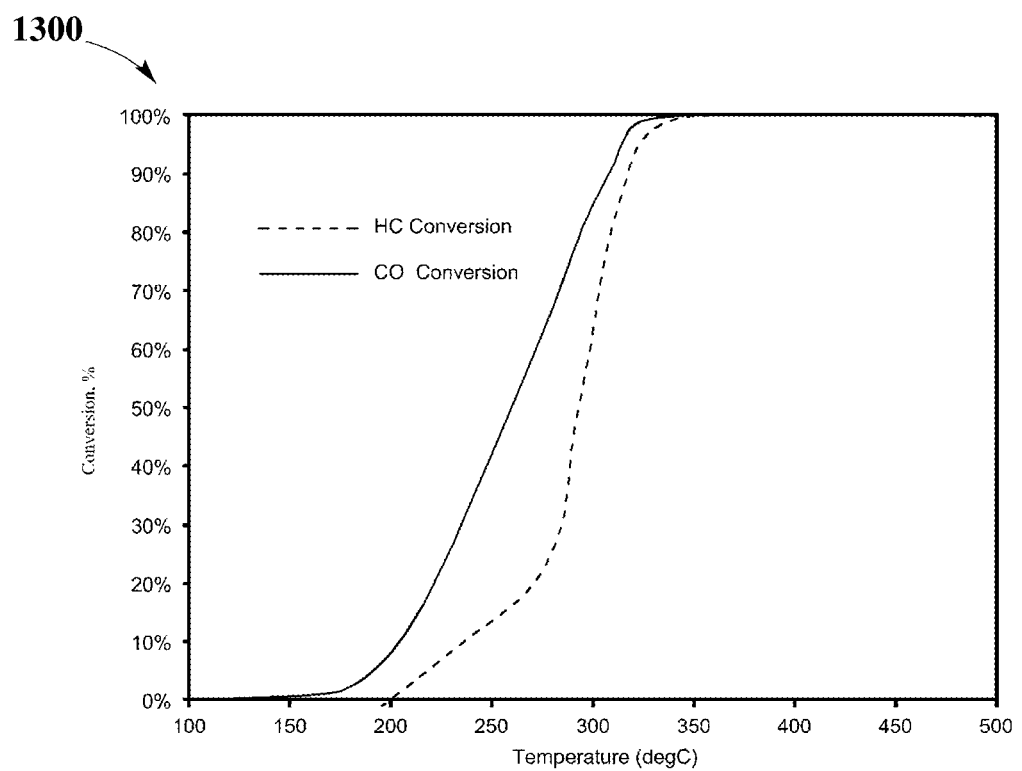
FIG. 13 shows light-off test results of a ZPGM catalyst system, according to an embodiment.

FIG. 13 shows the light-off test Results 1300 for the ZPGM Catalyst System 100 of example 9. Prior to the light of test, the ZPGM Catalyst System 100 of example 9 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 9 has a T50 and T90 for CO of 261° C. and 307° C. respectively, and a T50 and T90 for HC of 293° C. and 315° C. respectively.

In example 10, a ZPGM Catalyst System 100 including a ZPGM transition metal catalyst having a cordierite Substrate 102, a Washcoat 104 and no Overcoat 106 is prepared. Where Washcoat 104 includes at least silver, a carrier material oxide such as lanthanum doped alumina, and an oxygen storage material (which may be a mixture of cerium and zirconium). In this catalyst system, the oxygen storage material and the alumina may be present in Washcoat 104 in a ratio of 40% to about 60% by weight. The silver in Washcoat 104 is present in about 1% to about 20%, preferably about 4% to about 10% by weight. The amount of lanthanum oxide in alumina may be between 0.1% and 10% by weight. To prepare the ZPGM Catalyst System 100 of example 10, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours.

Figure 14:
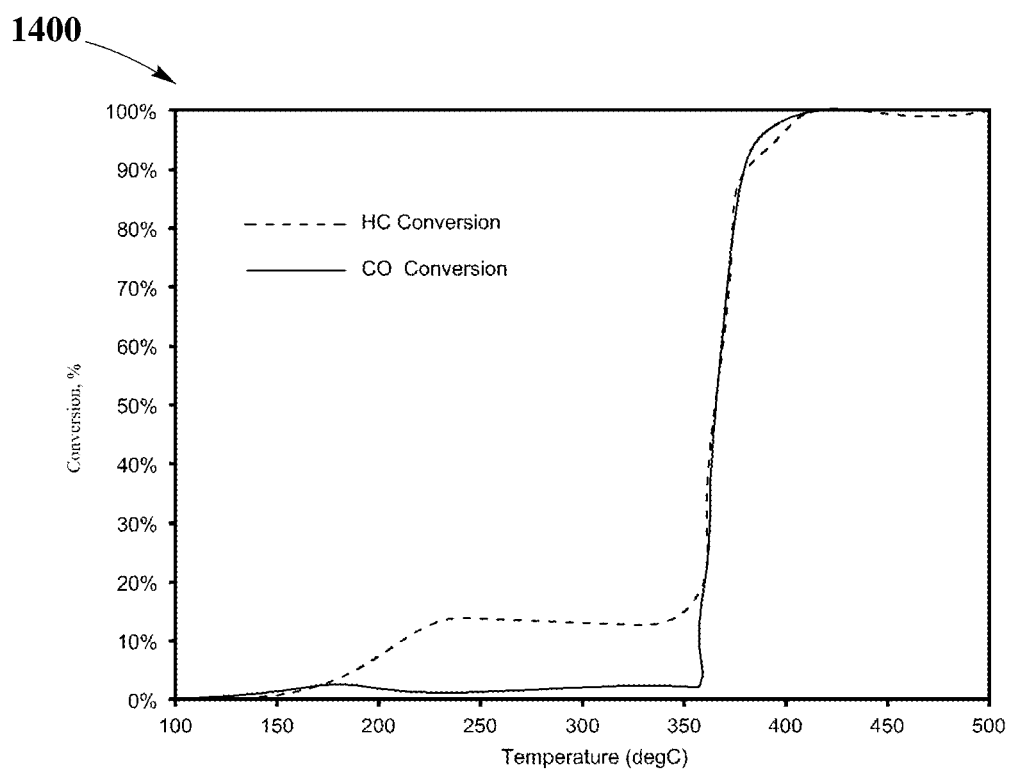
FIG. 14 shows light-off test results of a ZPGM catalyst system, according to an embodiment.

FIG. 14 shows the light-off test Results 1400 for the ZPGM Catalyst System 100 of example 10. Prior to the light of test, the ZPGM Catalyst System 100 of example 10 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 10 has a T50 for CO of 368° C. and a T50 for HC of 367° C.

In example 11, a ZPGM Catalyst System 100 including a ZPGM transition metal catalyst having a cordierite Substrate 102, a Washcoat 104 and an Overcoat 106 is prepared. The Washcoat 104 includes at least silver, a carrier material oxide such as lanthanum doped alumina. There is no OSM in Washcoat 104. The Overcoat 106 includes at least copper oxide, ceria, alumina, and one oxygen storage material. The oxygen storage material material present in Overcoat 106 is a mixture of cerium, zirconium, neodymium, and praseodymium. The silver in Washcoat 104 is present in about 1% to about 20%, or from about 4% to about 10% by weight. The amount of lanthanum oxide in alumina may be between 0.1% and 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 11, the transition metal (silver) and a carrier material oxide are milled together. The catalyst can be synthesized by any suitable chemical technique known in the art. The milled mixture of catalyst and carrier material oxides is deposited on the cordierite Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 15:
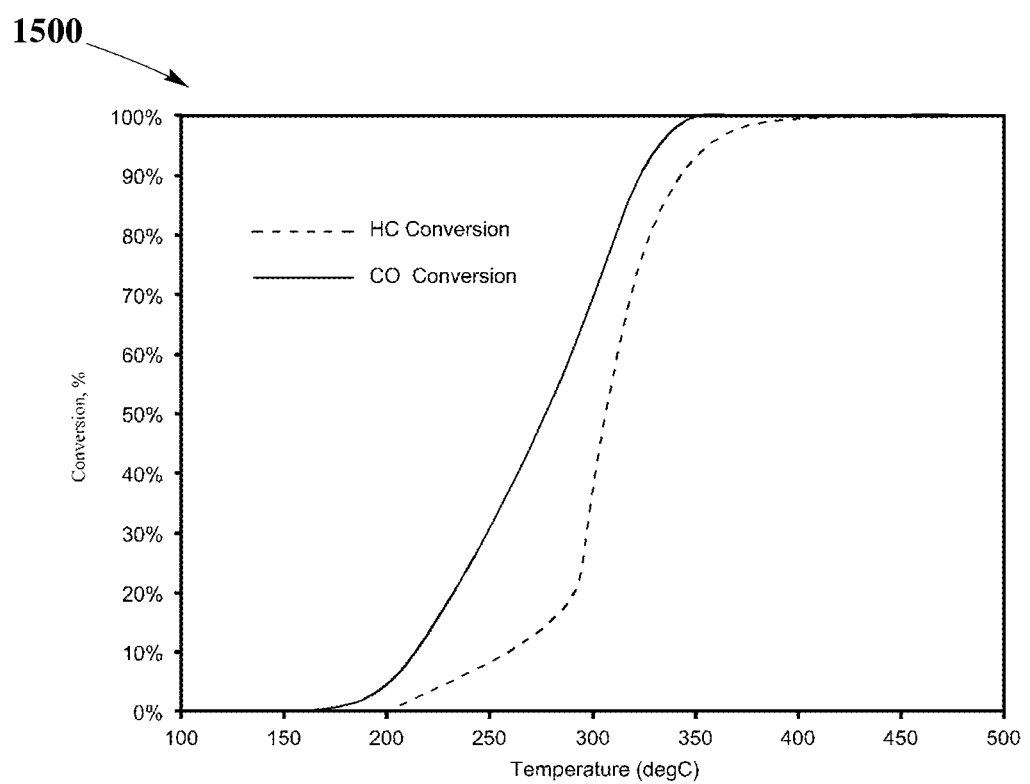
FIG. 15 shows light-off test results of a ZPGM catalyst system, according to an embodiment.

FIG. 15 shows the light-off test Results 1500 for the ZPGM Catalyst System 100 of example 11. Prior to the light of test, the ZPGM Catalyst System 100 of example 11 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 11 has a T50 for CO of 277° C. and a T50 for HC of 308° C.

In example 12, a ZPGM Catalyst System 100 including a ZPGM transition metal catalyst having a cordierite Substrate 102, a Washcoat 104 and an Overcoat 106 is prepared. The Washcoat 104 includes at least silver, a carrier material oxide such as alumina. There is no OSM in Washcoat 104. The Overcoat 106 includes at least copper oxide, ceria, alumina, and one oxygen storage material. The oxygen storage material material present in Overcoat 106 is a mixture of cerium, zirconium, neodymium, and praseodymium. The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 12, Washcoat 104 can be synthesized by any suitable chemical technique known in the art, deposited on the cordierite Substrate 102 and then heat treated. The Overcoat 106 is prepared by co-precipitation. Copper and cerium salts are precipitated with at least one suitable compound. Suitable compounds include NH4OH, (NH4)2CO3, tetraethylammonium hydroxide, other tetraalkylammonium salts, ammonium acetate, and ammonium citrate. Subsequently, the precipitated transition metal salts are deposited on a Substrate 102 previously coated with Washcoat 104. ZPGM Catalyst System 100 is heat treated, this treatment may be performed at about 300° C. to about 700° C. In some embodiments this treatment may be performed at about 550° C. The heat treatment may last from about 2 to about 6 hours. In an embodiment the treatment may last about 4 hours.

Figure 16:
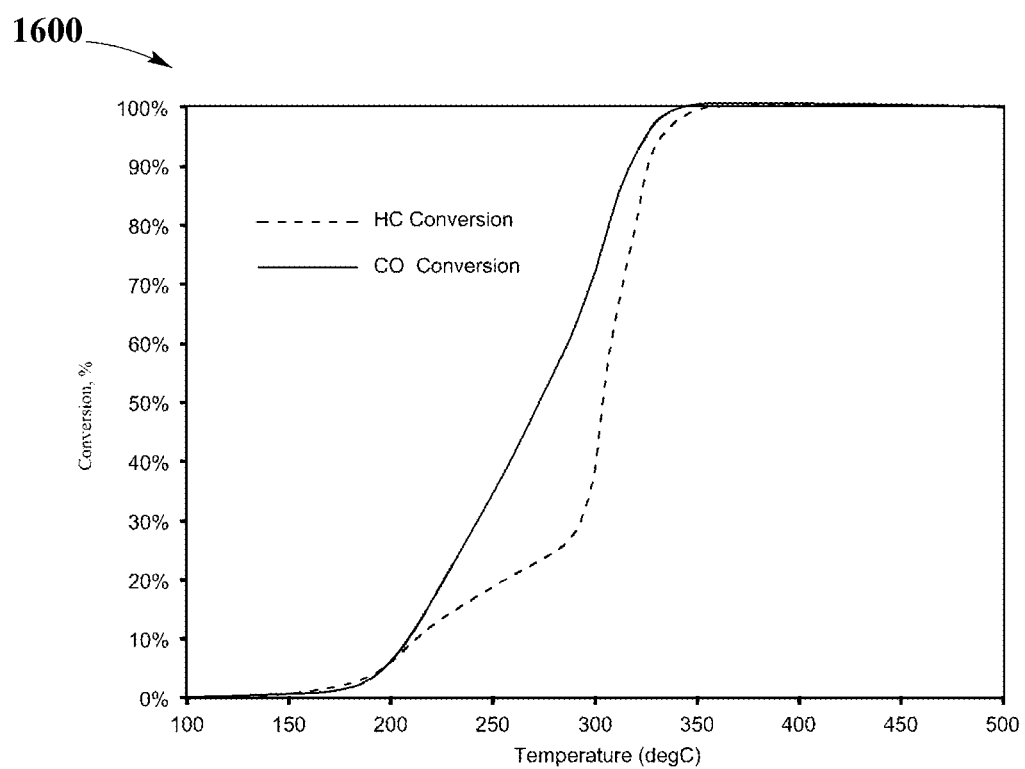
FIG. 16 shows light-off test results of a ZPGM catalyst system, according to an embodiment.

FIG. 16 shows the light-off test Results 1600 for the ZPGM Catalyst System 100 of example 12. Prior to the light of test, the ZPGM Catalyst System 100 of example 12 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 12 has a T50 for CO of 274° C. and a T50 for HC of 304° C.

Figure 17:
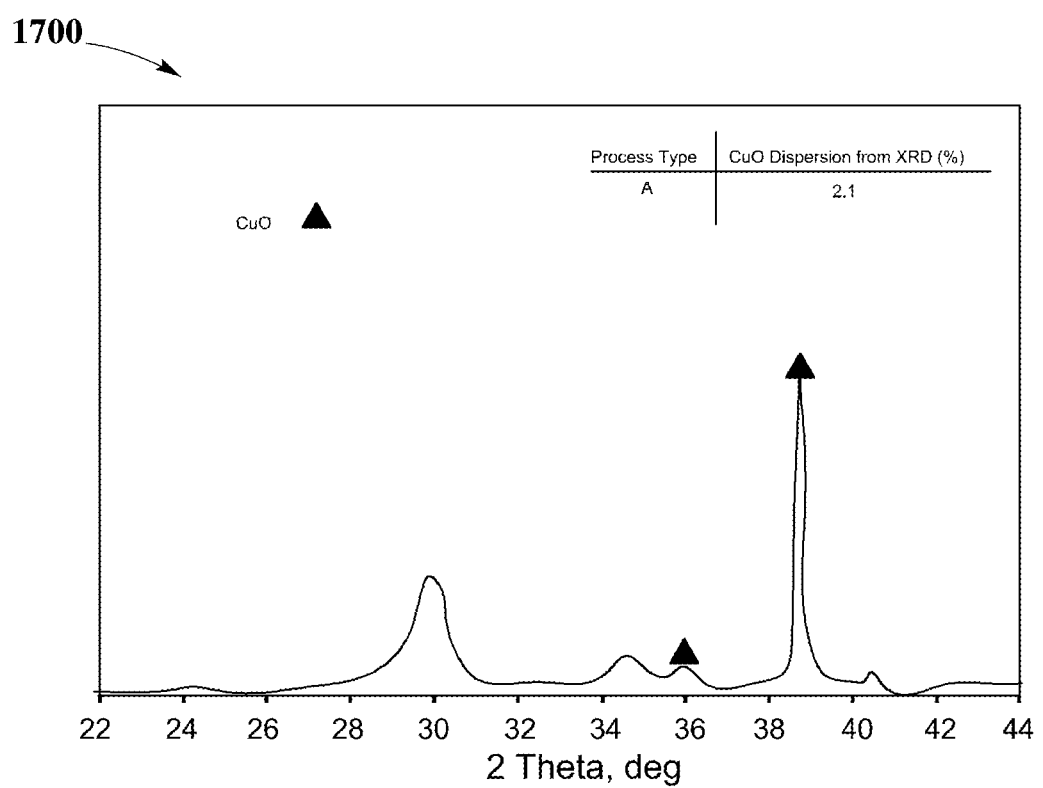
FIG. 17 shows the XRD spectra of a fresh sample of a ZPGM catalyst system, according to an embodiment.

FIG. 17 shows the XRD Spectra 1700 of the fresh Overcoat 106 samplesZPGM Catalyst System 100 of example 12. The XRD analysis is conducted to determine the crystalline phases present in Overcoat 106 materials and to determine the crystallite size of copper oxide. The XRD patterns are measured on a Rigaku® powder diffractometer (MiniFlexT™) using Cu Ka radiation in the 2-theta range of 20-90° with a step size of 0.02° and a dwell time of 1 s. The tube voltage and current were set at 40 kV and 30 mA, respectively. The resulting diffraction patterns are analyzed using the International Centre for Diffraction Data (ICDD) database. The CuO crystallite (filled triangle) presence, represented by triangles, is large in the "ZPGM Catalyst System 100 of example 12 as evidenced by the sharp peak of CuO at about 2-theta=38.7 degrees and the peak at about 2-theta=36 degrees. The CuO crystallite size was calculated at about 50 nm. The copper dispersion was then calculated about 2.1%.

In example 13, a ZPGM Catalyst System 100 including a ZPGM transition metal catalyst having a cordierite Substrate 102, a Washcoat 104 and an Overcoat 106 is prepared. The Washcoat 104 includes at least silver, a carrier material oxide such as alumina. There is no OSM in Washcoat 104. The Overcoat 106 includes at least copper oxide, ceria, alumina, and one oxygen storage material. The oxygen storage material material present in Overcoat 106 is a mixture of cerium, zirconium, neodymium, and praseodymium. The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 13, Washcoat 104 can be synthesized by any suitable chemical technique known in the art, deposited on the cordierite Substrate 102 and then heat treated. The Overcoat 106 is prepared by co-milling. Copper and cerium salts are milled with the carrier material oxide, alumina and the OSM. After milling the Overcoat 106 is deposited on a Substrate 102 previously coated with Washcoat 104. ZPGM Catalyst System 100 is then heat treated, this treatment may be performed at about 300° C. to about 700° C. In some embodiments this treatment may be performed at about 550° C. The heat treatment may last from about 2 to about 6 hours. In an embodiment the treatment may last about 4 hours.

Figure 18:
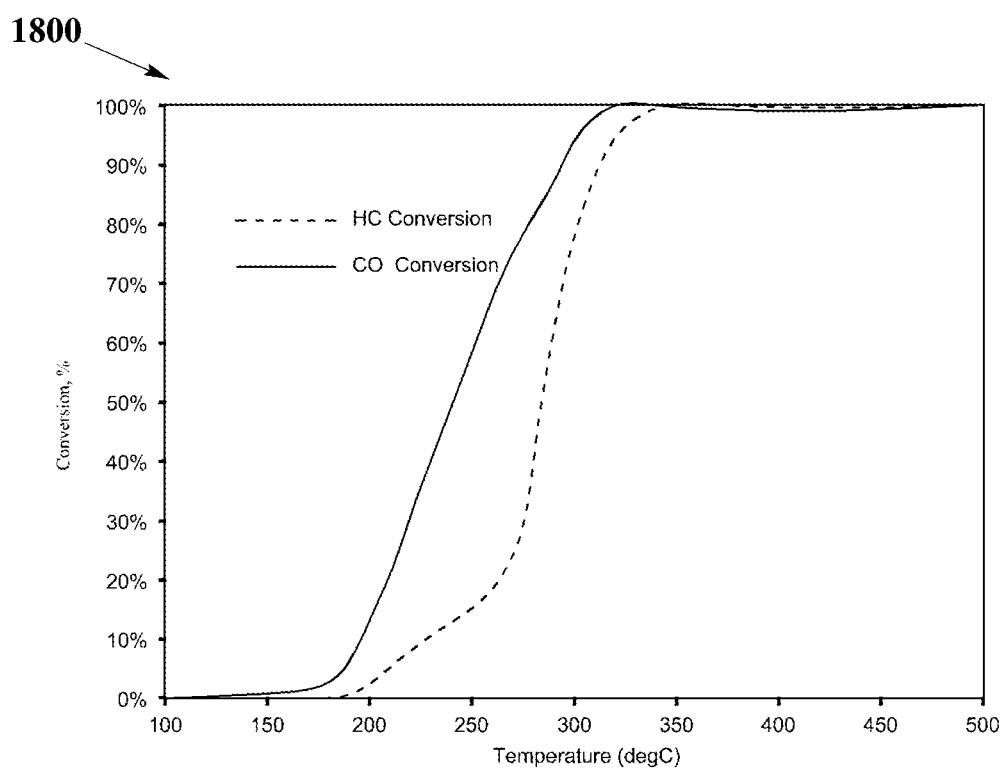
FIG. 18 shows light-off test results of a ZPGM catalyst system, according to an embodiment.

FIG. 18 shows the light-off test Results 1800 for the ZPGM Catalyst System 100 of example 13. Prior to the light of test, the ZPGM Catalyst System 100 of example 13 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 13 has a T50 for CO of 241° C. and a T50 for HC of 284° C.

Figure 19:
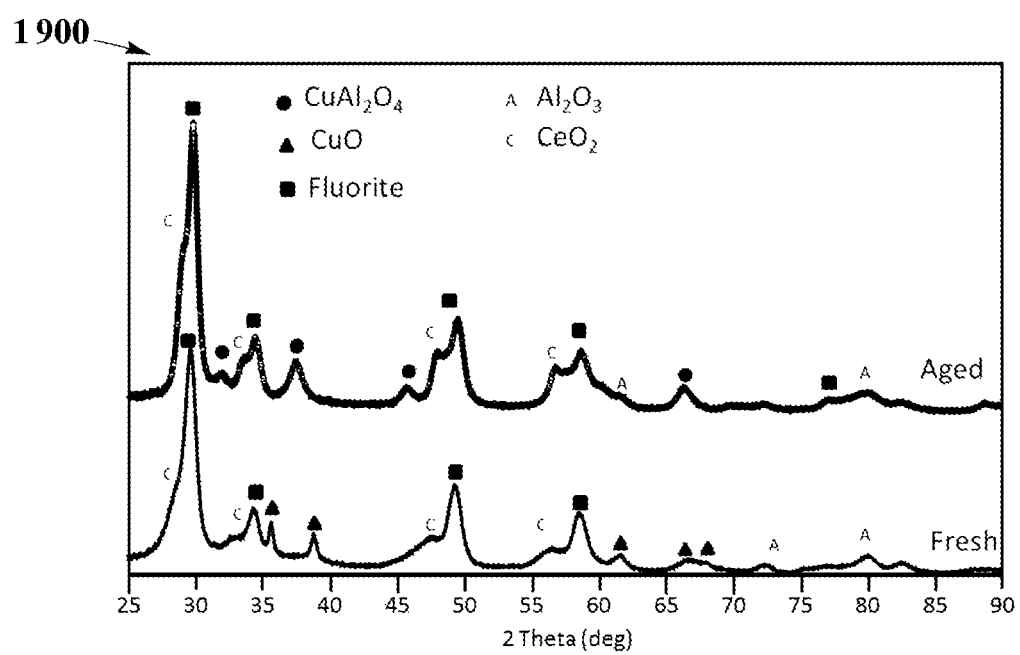
FIG. 19 shows the XRD spectra of fresh and aged samples of a ZPGM catalyst system, according to an embodiment.

FIG. 19 shows the XRD Spectra 1900 of the fresh and aged Overcoat 106 prepared for the ZPGM Catalyst System 100 of example 13. The XRD spectrum of the fresh sample shows the presence of fluorite structure (filled squares), alumina (A), ceria (C), and CuO (filled diamonds). The XRD pattern of the aged sample shows the presence of fluorite (filled squares), $CuAl_2O_4$ (filled circles), ceria (C), and alumina (A). The fluorite structure is larger in the aged sample as evidenced by the sharper peaks. The XRD spectra of fresh and aged Overcoat 106 samples shows that CuO transfers to $CuAl_2O_4$ spinel phase after aging. The CuO crystallite size for the fresh sample was calculated at about 18 nm and copper dispersion was calculated at about 4.8%.

In example 14, a ZPGM Catalyst System 100 including a ZPGM transition metal catalyst having a cordierite Substrate 102 and a Washcoat 104 and Overcoat 106 is prepared. Where Washcoat 104 includes alumina and at least one oxygen storage material. The Overcoat 106 includes copper, cerium, calcium, a carrier material oxide such as alumina, and an oxygen storage material (which may be a mixture of cerium, zirconium, neodymium and praseodymium). In this catalyst system, the oxygen storage material and the alumina may be present in Washcoat 104 in a ratio of 40% to about 60% by weight. Overcoat 106 includes between 5% and 15 wt % of copper, between 5% and 15 wt % of cerium and between 5% and 15 wt % of calcium. The Overcoat 106 is prepared by co-precipitation. Copper, cerium and calcium salts are precipitated with at least one suitable compound. Suitable compounds include $NH_4OH$, $(NH_4)_2CO_3$, tetraethylammonium hydroxide, other tetraalkylammonium salts, ammonium acetate, and ammonium citrate. Subsequently, the precipitated transition metal salts are deposited on a Substrate 102 previously coated with Washcoat 104. Overcoat 106 is heat treated, this treatment may be performed at about 300° C. to about 700° C. In some embodiments this treatment may be performed at about 550° C. The heat treatment may last from about 2 to about 6 hours. In an embodiment the treatment may last about 4 hours.

In example 15, a ZPGM Catalyst System 100 including a ZPGM transition metal catalyst having a cordierite Substrate 102, a Washcoat 104 and an Overcoat 106 is prepared. The Washcoat 104 includes at least calcium, a carrier material oxide, an oxygen storage material (which may be a mixture of cerium and zirconium) and alumina. The Overcoat 106 includes at least copper oxide, ceria, alumina, and one oxygen storage material. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The calcium in Washcoat 104 is present in about 5% to about 15% by weight. The alumina and oxygen storage material included in Overcoat 106 are present in a ratio of about 60% to about 40% by weight. The copper and cerium in Overcoat 106 are present in about 5% to about 50% by weight or from about 5% to 15% by weight of Cu and 5% to 15% by weight of Ce. To prepare the ZPGM Catalyst System 100 of example 15, the calcium salt is precipitated with at least one suitable compound. Suitable compounds include $NH_4OH$, $(NH_4)_2CO_3$, tetraethylammonium hydroxide, other tetraalkylammonium salts, ammonium acetate, and ammonium citrate. Subsequently, the precipitated transition metal salts are deposited on a Substrate 102 previously coated with Washcoat 104. Then, Overcoat 106 is heat treated, this treatment may be performed at about 300° C. to about 700° C. In some embodiments this treatment may be performed at about 550° C. The heat treatment may last from about 2 to about 6 hours. In an embodiment the treatment may last about 4 hours.

In example 16, a ZPGM Catalyst System 100 including a ZPGM transition metal catalyst having a cordierite Substrate 102, and Washcoat 104 is prepared. The Overcoat 106 includes at least tin, copper, cerium, a carrier material oxide, an oxygen storage material (which may be a mixture of cerium and zirconium) and alumina. In this example of ZPGM Catalyst System 100, the oxygen storage material and the alumina may be present in Washcoat 104 in a ratio of 40% to about 60% by weight. The tin is present in Overcoat 106 in about 1% to about 10%, or from about 3% to about 6% by weight. The copper and cerium are present in about 5% to about 50% by weight or from about 10% to 16% by weight of Cu and 12% to 20% by weight of Ce. To prepare the ZPGM Catalyst System 100 of example 16, the transition metal salts and a carrier material oxide are milled together. The milled mixture of catalysts and carrier material oxides is deposited on the Substrate 102 previously coated with Washcoat 104 in the form of Overcoat 106 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours.

In example 17, a ZPGM Catalyst System 100 including a ZPGM transition metal catalyst having a cordierite Substrate 102, a Washcoat 104 and an Overcoat 106 is prepared. The Overcoat 106 includes at least calcium, silver, Copper, Cerium a carrier material oxide, an oxygen storage material (which may be a mixture of cerium and zirconium) and alumina. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The calcium in Overcoat 106 is present in about 5% to about 15% by weight. The silver in Overcoat 106 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 5% to 15% by weight of Cu and 5% to 15% by weight of Ce. To prepare the ZPGM Catalyst System 100 of example 17, the calcium, silver, copper an cerium salts are precipitated with at least one suitable compound. Suitable compounds include $NH_4OH$, $(NH_4)_2CO_3$, tetraethylammonium hydroxide, other tetraalkylammonium salts, ammonium acetate, and ammonium citrate. Subsequently, the precipitated transition metal salts are deposited on a Substrate 102 previously coated with Washcoat 104. Afterwards, Overcoat 106 is heat treated, this treatment may be performed at about 300° C. to about 700° C. In some embodiments this treatment may be performed at about 550° C. The heat treatment may last from about 2 to about 6 hours. In an embodiment the treatment may last about 4 hours.

In example 18, a ZPGM Catalyst System 100 including a ZPGM transition metal catalyst having a cordierite Substrate 102, a Washcoat 104 and an Overcoat 106 is prepared. The Washcoat 104 includes at least Niobium oxide and zirconium oxide and mixture of metal oxide carrier such as alumina and ceria. The Overcoat 106 includes at least copper oxide, ceria, alumina, and one oxygen storage material. The oxygen storage material material present in Overcoat 106 is a mixture of cerium, zirconium, neodymium, and praseodymium. In this example of ZPGM Catalyst System 100, the oxygen storage material and the alumina may be present in Washcoat 104 in a ratio of 40% to about 60% by weight. The niobium in Washcoat 104 is present in about 10% to about 20% by weight. The zirconium in Washcoat 104 is present in about 30% to about 60% by weight. The alumina and oxygen storage material included in Overcoat 106 are present in a ratio of about 60% to about 40% by weight. The copper and cerium in Overcoat 106 are present in about 5% to about 50% by weight or from about 5% to 15% by weight of Cu and 5% to 15% by weight of Ce. To prepare the ZPGM Catalyst System 100 of example 18, the metal salt solutions are precipitated with at least one suitable compound. Suitable compounds include $NH_4OH$, $(NH_4)_2CO_3$, tetraethylammonium hydroxide, other tetraalkylammonium salts, ammonium acetate, and ammonium citrate. Subsequently, the precipitated transition metal salts are deposited on a Substrate 102 previously coated with Washcoat 104. Then, Overcoat 106 is heat treated, this treatment may be performed at about 300° C. to about 700° C. In some embodiments this treatment may be performed at about 550° C. The heat treatment may last from about 2 to about 6 hours. In an embodiment the treatment may last about 4 hours.

In example 19, a ZPGM Catalyst System 100 including a mixed metal oxide catalyst having a cordierite Substrate 102, a Washcoat 104 and impregnation is prepared. The Washcoat 104 includes at least a carrier metal oxide. The impregnation solution includes at least lanthanum, cerium, iron and cobalt. Lanthanum is present in about 10% to 30% by weight, cerium is present in about 6% to 20% by weight, iron is present in about 3% to 15% by weight and cobalt is present in about 5% to 10% by weight. To prepare the ZPGM Catalyst System 100 of example 19 the liquid solution of cobalt salt iron salt is added to the mixture of lanthanum and cerium salts which were already dissolved in dionized water. Subsequently, citric acid is added with a molar ratio of total metal to citric acid of 1:1.5. The pH of mixture is adjusted to approximately neutral condition. The mixture of metal solution is impregnated to the substrate already coated with Washcoat 104. The impregnated catalyst is heat treated, this treatment may be performed at about 700° C. The heat treatment may last from about 2 to about 6 hours. In an embodiment the treatment may last about 4 hours. The ZPGM Catalyst System 100 of example 19 has a perovskite structure $(La_{0.8}Ce_{0.2})(Fe_{0.5}Co_{0.5})O_3$.

In example 20, a ZPGM Catalyst System 100 including a mixed metal oxide catalyst having a cordierite Substrate 102, a Washcoat 104 and impregnation is prepared. The Washcoat 104 includes at least a carrier metal oxide. The impregnation solution includes at least lanthanum, cerium, iron, manganese and cobalt. Lanthanum is present in about 10% to 30% by weight, cerium is present in about 6% to 20% by weight, iron is present in about 3% to 15% by weight, manganese is present about 4% to 10% by weight, and cobalt is present in about 5% to 10% by weight. To prepare the ZPGM Catalyst System 100 of example 20 the liquid solution of cobalt salt iron salt is added to the mixture of lanthanum and cerium and manganese salts which were already dissolved in di-ionized water. Subsequently, citric acid is added with a molar ratio of total metal to citric acid of 1:1.5. The pH of mixture is adjusted to approximately neutral condition. The mixture of metal solution is impregnated to the Substrate 102 already coated with Washcoat 104. The impregnated catalyst is heat treated, this treatment may be performed at about 700° C. The heat treatment may last from about 2 to about 6 hours. In an embodiment the treatment may last about 4 hours. The catalyst of example 20 has a mixed phase perovskite and bixbyite structure of $La(Fe_{0.6}Co_{0.4})O_3$ and $FeMnO_3$.

In example 21, a ZPGM Catalyst System 100 including a mixed metal oxide catalyst having a cordierite Substrate 102, a Washcoat 104 and impregnation is prepared. The Washcoat 104 includes at least a carrier metal oxide. The impregnation solution includes at least iron and mangase. Iron is present in about 3% to 15% by weight and mangase is present in about 4% to 10% by weight. To prepare the ZPGM Catalyst System 100 of example 21 the iron salt iron salt is added to manganse salt in dionized water. Subsequently, citric acid is added with a molar ratio of total metal to citric acid of 1:1.5. The pH of mixture is adjusted to approximately neutral condition. The mixture of metal solution is impregnated to the substrate already coated with Washcoat 104. The impregnated catalyst is heat treated, this treatment may be performed at about 700° C. The heat treatment may last from about 2 to about 6 hours. In an embodiment the treatment may last about 4 hours. The ZPGM Catalyst System 100 of example 21 has a bixbyite structure $Mn_{1.4}Fe_{0.7}O_3$.

In example 22, a ZPGM Catalyst System 100 including a mixed metal oxide catalyst having a cordierite Substrate 102, Washcoat 104 and Overcoat 106 is prepared. The Washcoat 104 includes at least a carrier metal oxide. The Overcoat 106 includes at least lanthanum, cerium, iron and cobalt, and a mixed metal oxide carrier such as zirconia and ceria. Lanthanum is present in about 10% to 30% by weight, cerium is present in about 6% to 20% by weight, iron is present in about 3% to 15% by weight and cobalt is present in about 5% to 10% by weight. To prepare the Overcoat 106, the liquid solution of cobalt salt and iron salt is added to the mixture of lanthanum and cerium salts which were already dissolved in di-ionized water. Subsequently, citric acid is added with a molar ratio of total metal to citric acid of 1:1.5. The mixture of metal solution precipitated to the mixed metal oxide carrier with a suitable compounds. subsequently, the Overcoat 106 slurry is coated to the Substrate 102 already coated with Washcoat 104. Overcoat 106 is heat treated at 700 C for 4 hrs. The ZPGM Catalyst System 100 of example 22 has a perovskite structure $(La_{0.8}Ce_{0.2})(Fe_{0.5}Co_{0.5})O_3$.

In example 23, a ZPGM Catalyst System 100 including a a mixed metal oxide catalyst having a cordierite Substrate 102, Washcoat 104 and Overcoat 106 is prepared. The Washcoat 104 includes at least a carrier metal oxide. The Overcoat 106 includes at least lanthanum, cerium, iron and cobalt, manganese and a mixed metal oxide carrier such as zirconia and ceria. Lanthanum is present in about 10% to 30% by weight, cerium is present in about 6% to 20% by weight, iron is present in about 3% to 15% by weight, manganese is present in about 4% to 10% by weight and cobalt is present in about 5% to 10% by weight. To prepare the Overcoat 106, the liquid solution of cobalt salt and iron salt is added to the mixture of manganese, lanthanum and cerium salts which were already dissolved in di-ionized water. Subsequently, citric acid is added with a molar ratio of total metal to citric acid of 1:1.5. The mixture of metal solution precipitated to the mixed metal oxide carrier with a suitable compounds. Subsequently, the Overcoat 106 slurry is coated to the Substrate 102 already coated with Washcoat 104. Overcoat 106 is heat treated at 700 C for 4 hr. The ZPGM Catalyst System 100 of example 23 has a mixed phase perovskite and bixbyite structure of $La(Fe_{0.6}Co_{0.4})O_3$ and $FeMnO_3$.

In example 24, a ZPGM Catalyst System 100 including a ZPGM transition metal catalyst having a metallic Substrate 102, a Washcoat 104 and an Overcoat 106 is prepared. The Substrate 102 has a length of 60 mm, a diameter of 40 mm and a cell density of 300 cells per square inch (cpsi). The Washcoat 104 includes at least silver, a carrier material oxide such as alumina. There is no OSM in Washcoat 104. The Overcoat 106 includes at least copper oxide, ceria, alumina, and one oxygen storage material. The oxygen storage material material present in Overcoat 106 is a mixture of cerium, zirconium, neodymium, and praseodymium. The silver in Washcoat 104 is present in about 1% to about 20%, or from about 4% to about 10% by weight. The alumina and oxygen storage material included in Overcoat 106 are present in a ratio of about 60% to about 40% by weight. The copper and cerium in Overcoat 106 are present in about 5% to about 50% by weight or from about 10% to 16% by weight of Cu and 12% to 20% by weight of Ce. To prepare the ZPGM Catalyst System 100 of example 24, the transition metal (silver) and a carrier material oxide are milled together. The catalyst can be synthesized by any suitable chemical technique known in the art. The milled mixture of catalyst and carrier material oxides is deposited on the metallic Substrate 102 in the form of a Washcoat 104 and then heat treated. This treatment may be performed at about 300° C. to about 700° C. In some embodiments this treatment may be performed at about 550° C. The heat treatment may last from about 2 to about 6 hours. In an embodiment the treatment may last about 4 hours. The Overcoat 106 is prepared following a similar method.

Figure 20:
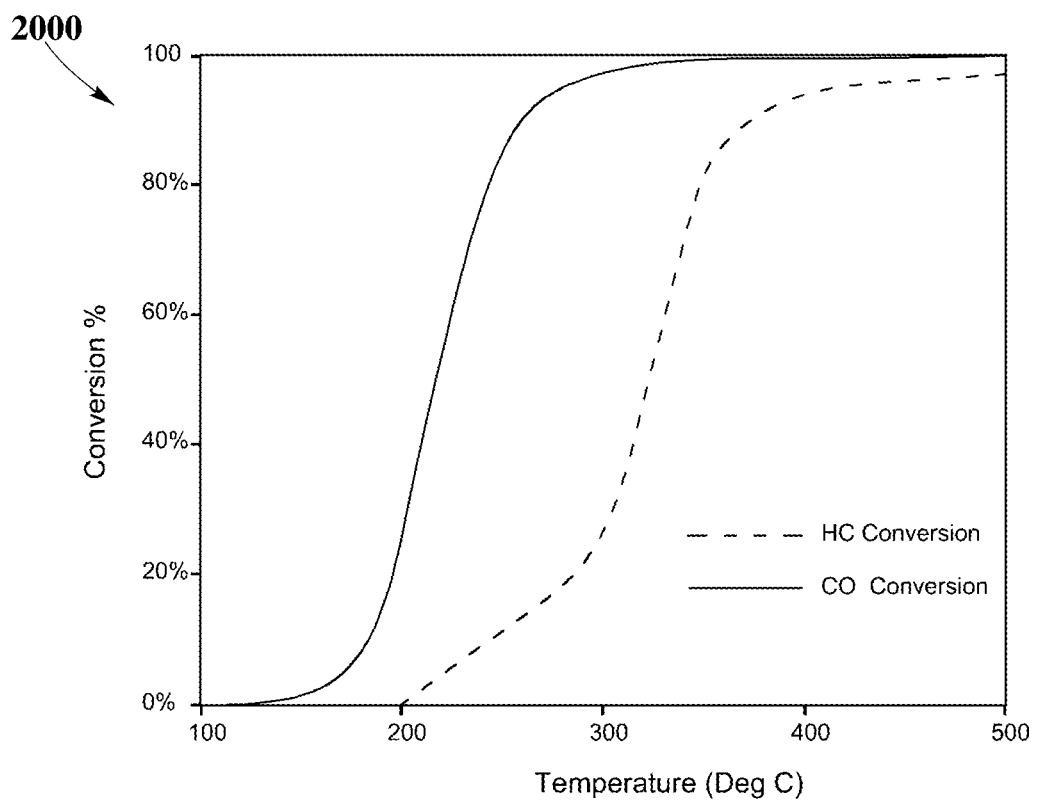
FIG. 20 shows light-off test results of a ZPGM catalyst system, according to an embodiment.

FIG. 20 shows light-off test Results 2000 for a fresh sample of the ZPGM Catalyst System 100 of example 24. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 34 has a T50 for CO of 206° C. and a T50 for HC of 301° C.

Figure 21:
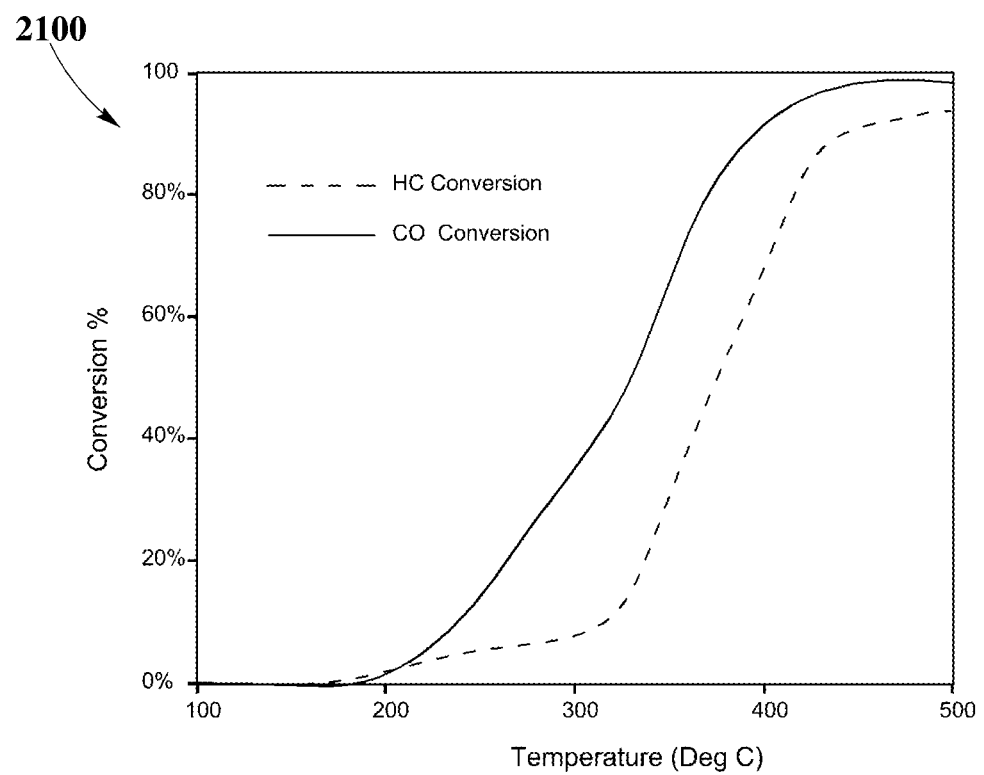
FIG. 21 shows light-off test results of a ZPGM catalyst system, according to an embodiment.

FIG. 21 shows the light-off test Results 2100 for an aged sample of the ZPGM Catalyst System 100 of example 24. Prior to the light of test, the ZPGM Catalyst System 100 of example 34 is aged under dry air condition at 900° C. for 4 hours. The hydrocarbon present in the feed stream is toluene. Carbon monoxide, and hydrocarbons conversion are measured as a function of the ZPGM Catalyst System 100 temperature. Since the light-off test is performed under lean condition (R-values<1), no nitrogen oxide conversion is measured. The test is performed by increasing the temperature from about 100° C. to 500° C. at a constant rate of 40° C./min. The light-off test at R=0.611 shows that the ZPGM Catalyst System 100 of example 24 has a T50 for CO of 284° C. and a T50 for HC of 342° C.

I claim:

1. A method for reducing emissions from an engine having associated therewith an exhaust system, the method providing a catalyst system for a reaction effective for selective catalytic reduction, comprising:

provided a substrate;

depositing on said substrate a washcoat suitable for deposition on the substrate, comprising at least one oxide solid, silver, or mixtures thereof; and depositing an overcoat suitable for deposition on the substrate, comprising copper oxide, cerium, or mixtures thereof;

wherein the one of the washcoat or overcoat is capable of converting at least one selected from the group consisting of CO, $NO_x$ and HC.

2. The method of claim 1, wherein the ratio of the oxide solid and an oxygen storage material in the washcoat is about 60:40 by weight.

3. The method of claim 2, wherein the oxide solid is alumina.

4. The method of claim 1, wherein the silver is about 1% to about 20% by weight of the washcoat.

5. The method of claim 1, wherein the silver is about 4% to about 10% by weight of the washcoat.

6. The method of claim 1, wherein the silver and the at least one oxide solid are milled together.

7. The method of claim 1, further comprising heating said substrate and said washcoat to between about 300° Celsius and about 700° Celsius.

8. The method of claim 7, wherein the heating duration is from about 2 hours to about 6 hours.

9. The method of claim 1, further comprising heating said substrate and said washcoat to about 550° Celsius.

10. The method of claim 9, wherein the heating duration is about 4 hours.

11. The method of claim 1, wherein the T50 conversion temperature for carbon monoxide is less than 250 degrees Celsius.

12. The method of claim 1, wherein the T50 conversion temperature for hydrocarbons is about 400 degrees Celsius.

13. The method of claim 1, wherein the overcoat further comprises silver.

14. The method of claim 1, wherein the washcoat further comprises an oxygen storage material.

15. The method of claim 1, wherein the washcoat further comprises at least one element selected from the group consisting of calcium, tin, niobium, zirconium, lanthanum, iron, and cobalt.

16. A catalytic apparatus, comprising:
a catalyst system, comprising:
a substrate comprising cordierite;
a washcoat suitable for deposition on the substrate, comprising at least one oxygen storage material and alumina; and
an overcoat suitable for deposition on the substrate, comprising copper oxide, cerium, alumina, and at least one oxygen storage material,
wherein the ratio of the alumina and the oxygen storage material in the washcoat is about 60:40 by weight and the ratio of the alumina and the oxygen storage material in the overcoat is about 40:60 by weight;
wherein the one of the washcoat or overcoat is capable of converting at least one selected from the group consisting of CO, $NO_x$ and HC.

17. The apparatus of claim 16, wherein the at least one oxygen storage material of the washcoat comprises at least one element selected from the group consisting of cerium, zirconium, samarium, lanthanum, and yttrium.

18. The apparatus of claim 16, wherein the at least one oxygen storage material of the overcoat comprises at least one element selected from the group consisting of cerium, zirconium, neodymium, and praseodymium.

19. The apparatus of claim 16, wherein the copper oxide of the overcoat is about 10% to about 16% by weight of the overcoat.

20. The apparatus of claim 16, wherein the cerium of the overcoat is about 12% to about 20% by weight of the overcoat.

21. The apparatus of claim 16, wherein the catalyst system is heated to about 550° Celsius for about 4 hours.

22. The apparatus of claim 16, wherein the T50 conversion temperature for carbon monoxide is less than 250 degrees Celsius.

23. The apparatus of claim 16, wherein the T50 conversion temperature for hydrocarbons is less than about 400 degrees Celsius.

* * * * *